(12) United States Patent
Sannohe et al.

(10) Patent No.: US 7,901,082 B2
(45) Date of Patent: Mar. 8, 2011

(54) ILLUMINATION OPTICAL DEVICE AND PROJECTION DISPLAY DEVICE

(75) Inventors: Shinya Sannohe, Osaka (JP); Mitsuhiro Wada, Kyoto (JP)

(73) Assignee: Panasonic Corporation, Osaka (JP)

( * ) Notice: Subject to any disclaimer, the term of this patent is extended or adjusted under 35 U.S.C. 154(b) by 229 days.

(21) Appl. No.: 12/303,016

(22) PCT Filed: Jun. 1, 2007

(86) PCT No.: PCT/JP2007/061194
§ 371 (c)(1),
(2), (4) Date: Dec. 1, 2008

(87) PCT Pub. No.: WO2007/142141
PCT Pub. Date: Dec. 13, 2007

(65) Prior Publication Data
US 2009/0196036 A1    Aug. 6, 2009

(30) Foreign Application Priority Data

Jun. 2, 2006 (JP) ................................ 2006-154266
Nov. 30, 2006 (JP) ................................ 2006-323385

(51) Int. Cl.
*G03B 21/14*    (2006.01)
(52) U.S. Cl. ............... 353/30; 353/81; 353/94; 362/234; 362/241
(58) Field of Classification Search ........ 353/81, 353/94, 30; 362/228, 234, 241, 244, 247, 362/237
See application file for complete search history.

(56) References Cited

U.S. PATENT DOCUMENTS

| | | | |
|---|---|---|---|
| 6,222,674 B1 * | 4/2001 | Ohta | 359/618 |
| 6,224,217 B1 * | 5/2001 | Tanaka | 353/94 |
| 6,992,718 B1 | 1/2006 | Takahara | |
| 7,182,468 B1 * | 2/2007 | Haven | 353/94 |
| 7,222,975 B2 * | 5/2007 | Lin | 353/94 |
| 7,360,900 B2 * | 4/2008 | Sakata et al. | 353/20 |
| 7,530,696 B2 * | 5/2009 | Govyadinov et al. | 353/94 |
| 2002/0030795 A1 * | 3/2002 | Yamamoto | 353/94 |

(Continued)

FOREIGN PATENT DOCUMENTS

EP    1370089 A1    12/2003

(Continued)

*Primary Examiner* — William C Dowling
(74) *Attorney, Agent, or Firm* — Hamre, Schumann, Mueller & Larson, P.C.

(57) ABSTRACT

There are provided 2n (n is 2 or more) light sources 21a to 21d, 2n first collective optical systems composed of ellipsoidal mirrors 21a to 21d that are arranged so as to focus light beams emitted from the respective light sources, n first light combiner optical systems that are composed of prisms 23a and 23b, each having an isosceles triangular prism shape in cross section, and are arranged so as to synthesize exiting light beams from respective corresponding two of the first collective optical systems, second collective optical systems 26a and 26b arranged so as to focus exiting light beams from the respective first light combiner optical systems, a n/2 second light combiner optical system composed of a prism 27 having an isosceles triangular prism shape in cross section and arranged so as to synthesize exiting light beams from respective corresponding two of the second collective optical systems, and a third collective optical system 35 composed of a plurality of lenses and a plurality of lens arrays and arranged so as to allow exiting light beam from the second light combiner optical system to be incident thereon. The 2n first collective optical systems each have an optical axis substantially parallel to one another.

32 Claims, 14 Drawing Sheets

U.S. PATENT DOCUMENTS

| | | |
|---|---|---|
| 2002/0033933 A1* | 3/2002 | Yamamoto ................ 353/94 |
| 2002/0048172 A1 | 4/2002 | Wada et al. |
| 2003/0227598 A1 | 12/2003 | Shouji |
| 2005/0024602 A1* | 2/2005 | Shimaoka et al. .......... 353/94 |
| 2005/0062944 A1* | 3/2005 | Slobodin ................... 353/94 |
| 2006/0066815 A1 | 3/2006 | Nakamura |
| 2007/0188720 A1* | 8/2007 | Govyadinov et al. ...... 353/121 |
| 2008/0043206 A1* | 2/2008 | Chou et al. ................ 353/81 |
| 2009/0116117 A1* | 5/2009 | Sakai ........................ 359/619 |
| 2009/0273760 A1* | 11/2009 | Itoh .......................... 353/38 |

FOREIGN PATENT DOCUMENTS

| | | |
|---|---|---|
| EP | 1640798 A1 | 3/2006 |
| JP | 2000-171901 A | 6/2000 |
| JP | 2000-180796 A | 6/2000 |
| JP | 2000-194067 A | 7/2000 |
| JP | 2001-21996 | 1/2001 |
| JP | 3581568 | 7/2004 |
| WO | WO 2004/034142 A1 | 4/2004 |

* cited by examiner

ILLUMINATION OPTICAL DEVICE AND PROJECTION DISPLAY DEVICE

TECHNICAL FIELD

The present invention relates to an illumination optical device that illuminates a light valve as an image forming means with light from a light source and a projection display device that illuminates an image formed on the light valve with illumination light so as to magnify and project the image onto a screen with a projection lens.

BACKGROUND ART

A magnification-type display device such as a projector is well known, which forms an optical image depending on a video signal on a light valve, and illuminates the optical image with light so as to magnify and project the optical image onto a screen with a projection lens, whereby a large screen video image is obtained.

In such a projection display device, when three light valves are used corresponding to light beams of three primary colors of red, green, and blue, a projected image with high brightness, high resolution, and satisfactory color reproduction can be displayed. Further, a plurality of light sources may be used to bring about the following advantages. That is, a projected image with higher brightness can be obtained, and even if one of the light sources does not illuminate due to a malfunction, the projected image can be displayed without interruption when the other light source illuminates. A projection display device using a plurality of light sources is disclosed in Patent Documents 1 and 2, for example.

FIG. 11 shows a configuration example of a projection display device with two light sources disclosed in Patent Document 2. In FIG. 11, light beams emitted from light sources 1a and 1b are focused on a light combiner prism 3 by ellipsoidal mirrors 2a and 2b, respectively. The light combiner prism 3, which has a reflecting mirror on its light incident surface, reflects the focused light beams from the ellipsoidal mirrors 2a and 2b as divergent light toward a side of the collective optical system including a focusing lens 11, so that their optical axes are close to each other, and the two light beams are synthesized and travel in the same direction along an optical axis 10 of a collective optical system.

The light from the light combiner prism 3 is converted into substantially parallel light by the focusing lens 11. The substantially parallel light from the focusing lens 11 is incident on a first lens array plate 12 composed of a plurality of lenses. The light beam incident on the first lens array plate 12 is split into numerous light beams, and the numerous light beams thus obtained are converged on a second lens array plate 13 composed of a plurality of lenses. On the second lens array plate 13, many minute images of the plurality of light sources 1a and 1b are formed.

Each of the lens elements of the first lens array plate 12 has a focal length equal to a distance between the first lens array plate 12 and the second lens array plate 13. The lens element of the first lens array plate 12 has an aperture in a shape similar to that of a liquid crystal panel 16. Each of the lens elements of the second lens array plate 13 has a focal length that is determined so that a surface of the first lens array plate 12 and a surface of the liquid crystal panel 16 have a substantially conjugate relationship.

An illumination lens 14 is provided for overlapping exiting light beams from the respective lens elements of the second lens array plate 13 on the liquid crystal panel 16 so that the liquid crystal panel is illuminated with the thus overlapped light beams. The numerous exiting light beams from the second lens array plate 13 are overlapped on the liquid crystal panel 16, so that the liquid crystal panel 16 is illuminated uniformly with high efficiency.

A field lens 15 is provided for focusing the light beams illuminating the liquid crystal panel 16 on a pupil plane 18 of a projection lens 17. The projection lens 17 projects an optical image formed on the liquid crystal panel 16 onto a screen (not shown).

Patent Document 1: Japanese Patent No. 3581568
Patent Document 2: JP 2000-171901 A

DISCLOSURE OF INVENTION

Problem to be Solved by the Invention

In general, in order to increase the brightness of a projection display device, a discharge lamp as a light source may be allowed to consume higher power. However, this shortens the life of the discharge lamp. When a discharge lamp is allowed to consume higher power with its life ensured, a light emitting portion becomes larger, resulting in a decrease in light utilization efficiency.

In view of the above, it is more efficient to use a plurality of light sources that consume relatively lower power so as to increase the brightness of a projection display device.

In the case of the configuration in FIG. 11, however, only the two light sources can be used. Thus, there is a limit to power to be consumed by the single light source for ensuring reliability. When more light sources are used, a storage space in the device becomes larger, which leads to upsizing of the projection display device.

The present invention has been conceived to solve the conventional problems as described above, and it is an object of the present invention to provide a projection display device that can be configured with a compact size as a whole without causing a decrease in light utilization efficiency even when using more than two light sources.

Means for Solving Problem

In order to achieve the above-described object, an illumination optical device according to the present invention includes: 2n (n is 2 or more) light sources; 2n first collective optical systems composed of ellipsoidal mirrors that are arranged so as to focus light beams emitted from the respective light sources; n first light combiner optical systems that are composed of prisms, each having an isosceles triangular prism shape in cross section, and are arranged so as to synthesize exiting light beams from respective corresponding two of the first collective optical systems; second collective optical systems arranged so as to focus exiting light beams from the respective first light combiner optical systems; a n/2 second light combiner optical system composed of a prism having an isosceles triangular prism shape in cross section and arranged so as to synthesize exiting light beams from respective corresponding two of the second collective optical systems; and a third collective optical system composed of a plurality of lenses and a plurality of lens arrays and arranged so as to allow exiting light beam from the second light combiner optical system to be incident thereon. The 2n first collective optical systems each have an optical axis substantially parallel to one another.

A projection display device according to the present invention includes: an image forming device that modifies incident light to form an image; an illumination optical device that illuminates the image forming device with light from light sources; and a projection device that magnifies and projects an optical image formed on the image forming device. The illumination optical device with the above-described configuration is used as the illumination optical device.

EFFECTS OF THE INVENTION

According to the configuration of the present invention, it is possible to realize a projection display device that, in the case of using three or more light sources, ensures reliability by suppressing power consumption of a single light source, and can achieve illumination with high efficiency with a compact size projecting an image with extra-high brightness.

Figure 1A:
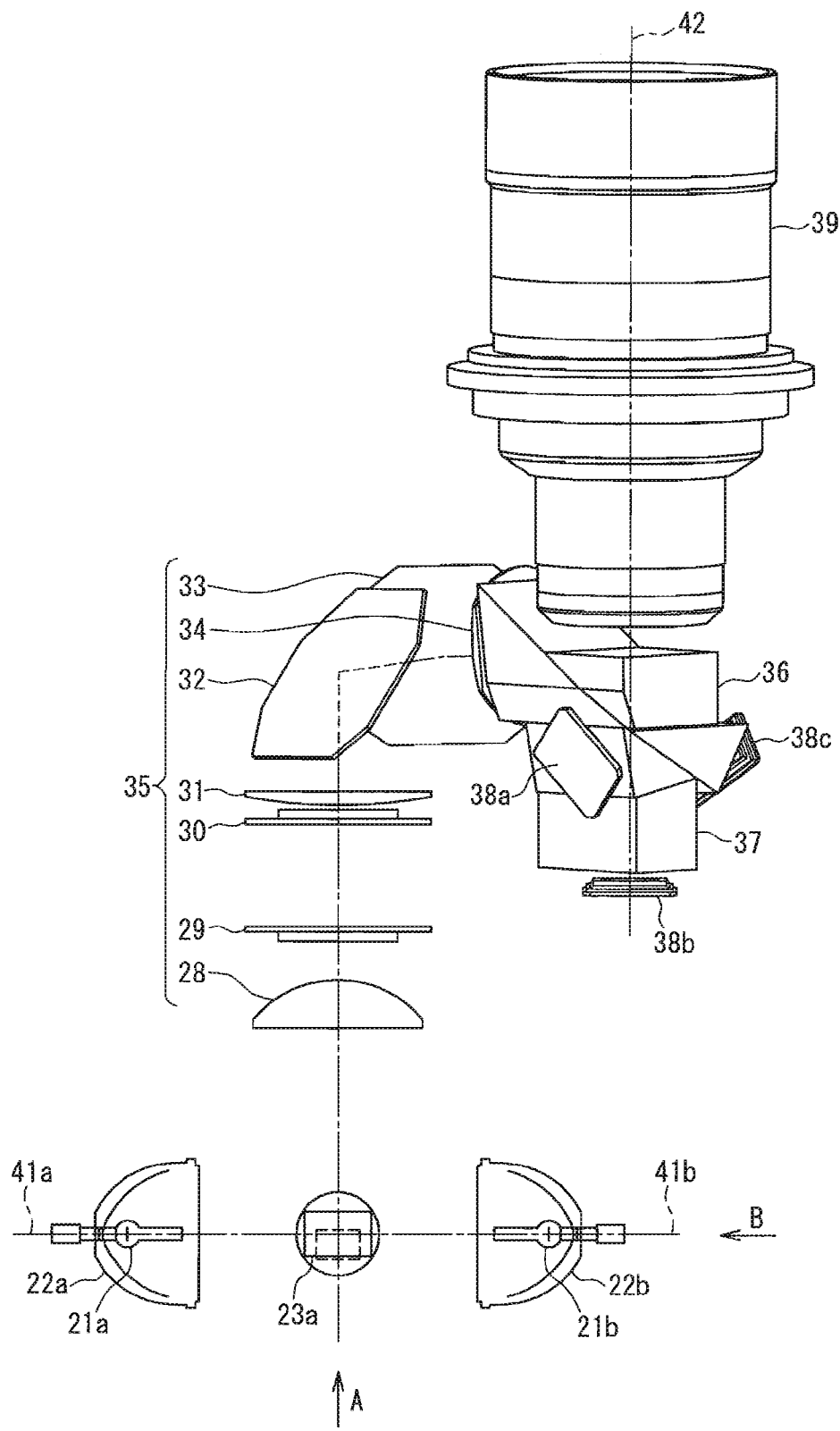
FIG. 1A is a front view showing an overall configuration of a projection display device according to Embodiment 1 of the present invention.

EXPLANATION OF LETTERS OR NUMERALS 1a-1b, 21a-21d, 51a-51d, 81a-81d, 111a-111d Light source 2a-2b, 22a-22b, 52a-52b, 82a-82b, 112a-112b Ellipsoidal mirror 3, 23a, 23b, 27, 53a, 53b, 57, 83a, 83b, 85, 114a, 114b, 116 Light combiner prism 35, 65, 93, 125 Third collective optical system 38a-38c, 68a-68c, 96a-96c, 128a-128c Reflection-type light valve 39, 69, 97, 129 Projection lens 26a, 26b, 56a, 56b Focusing lens system 84a, 84b, 115a, 115b Concave mirror

DESCRIPTION OF THE INVENTION

Based on the above-described configuration, the illumination optical device of the present invention can assume various embodiments. For example, each of the second collective optical systems can be composed of at least one lens or a concave mirror whose reflecting surface has an anamorphic aspherical shape. Also, embodiments as described in the claims can be applied so as to achieve properties according to various uses.

Hereinafter, embodiments of a projection display device according to the present invention will be described with reference to the drawings.

Embodiment 1

Figure 1B:
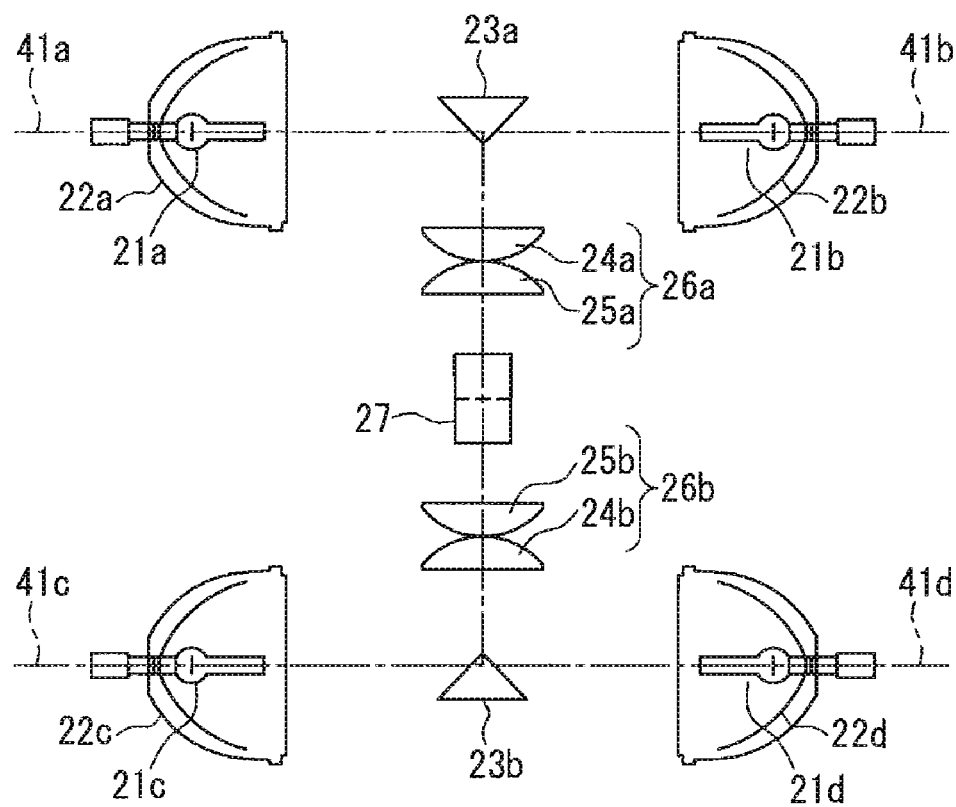
FIG. 1B is a bottom view showing an arrangement of light sources in FIG. 1A seen in a direction of an arrow A.
Figure 1C:
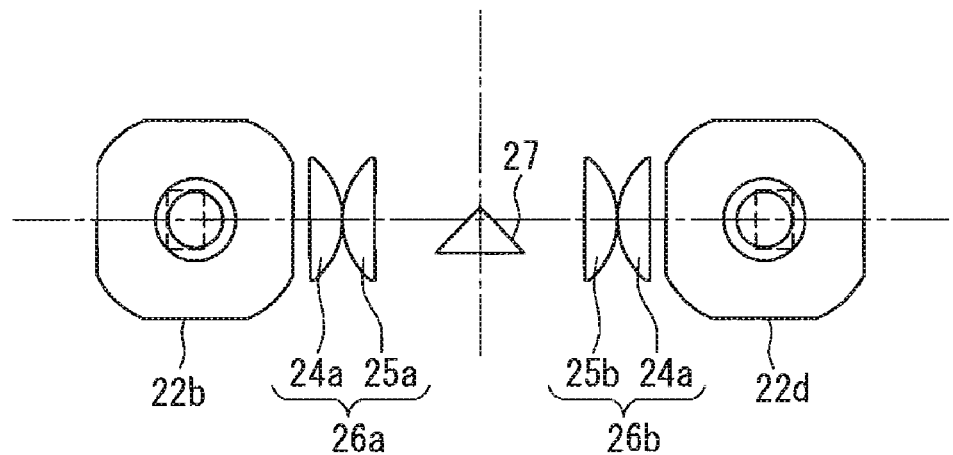
FIG. 1C is a side view showing the arrangement of the light sources in FIG. 1A seen in a direction of an arrow B.
Figure 2:
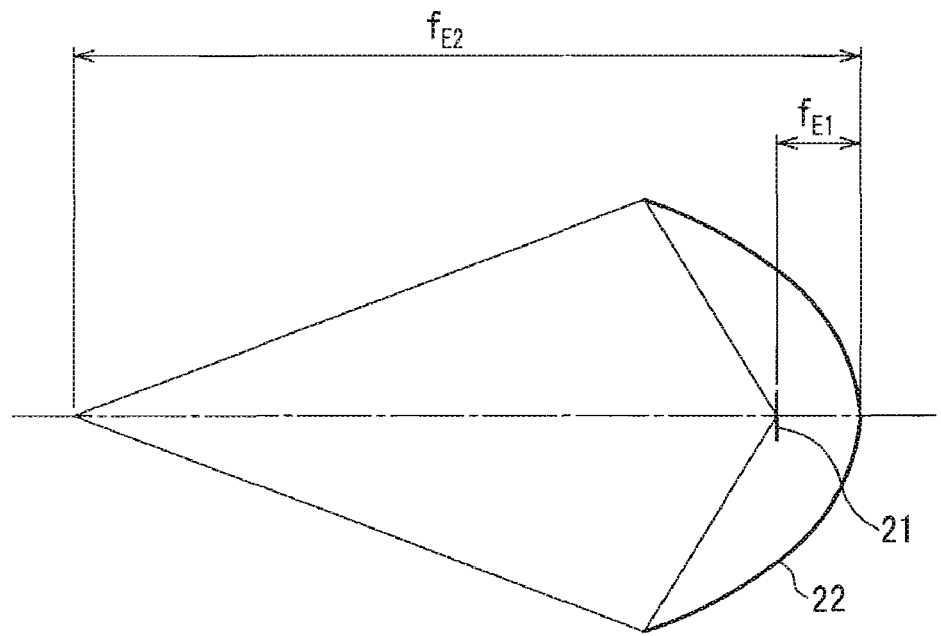
FIG. 2 is a cross-sectional view showing a schematic configuration of an ellipsoidal mirror of the projection display device according to Embodiment 1 of the present invention.
Figure 3:
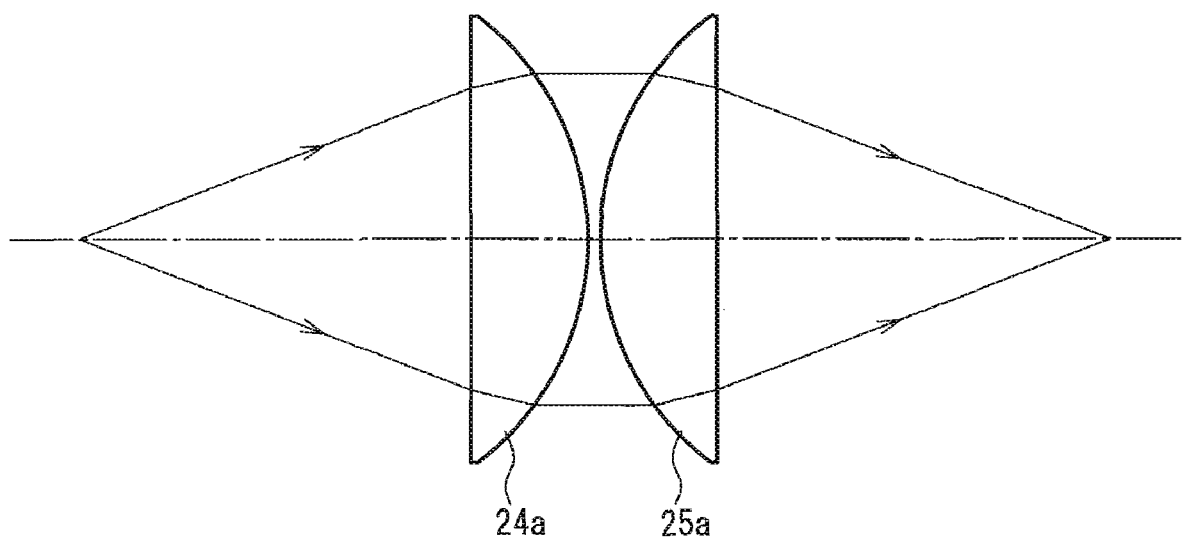
FIG. 3 is a cross-sectional view showing a schematic configuration of a focusing lens system of the projection display device.
Figure 4:
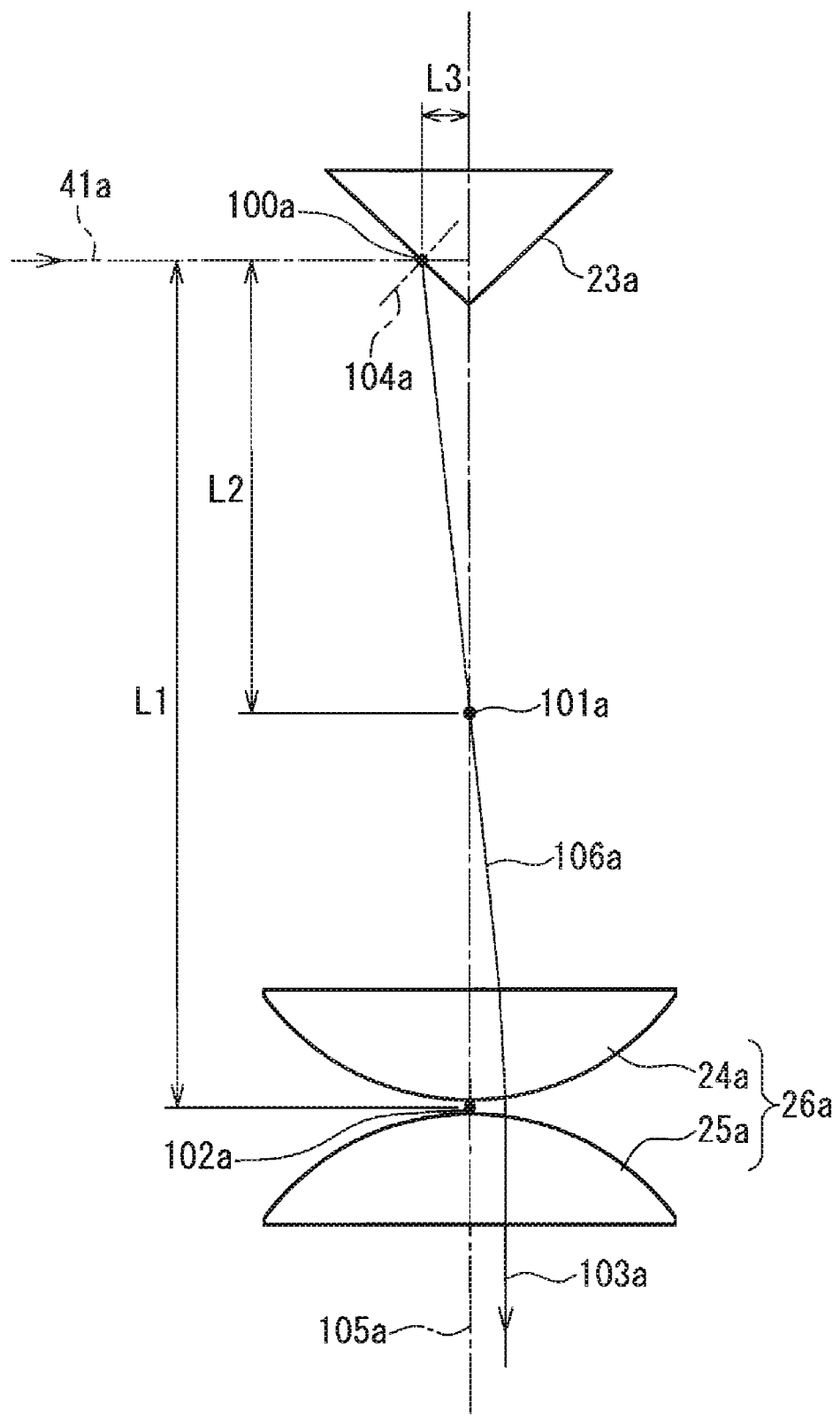
FIG. 4 is a cross-sectional view showing a schematic configuration of the focusing lens system of the projection display device.
Figure 5A:
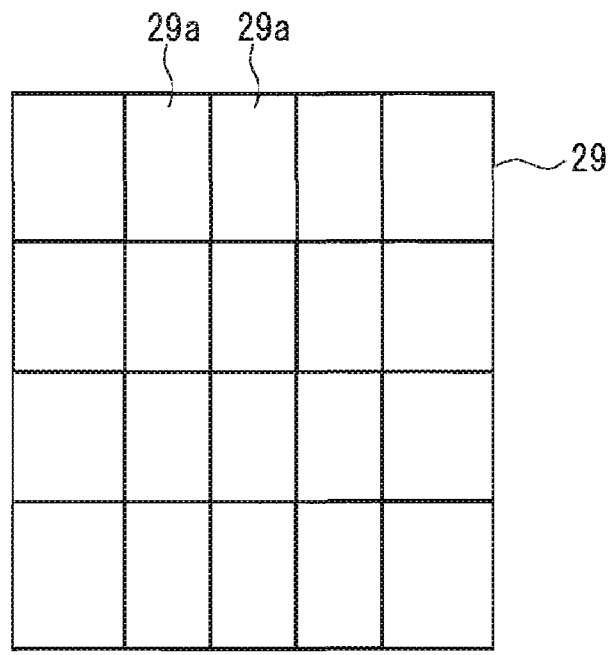
FIG. 5A is a front view showing a schematic configuration of a first lens array included in the projection display device.
Figure 5B:
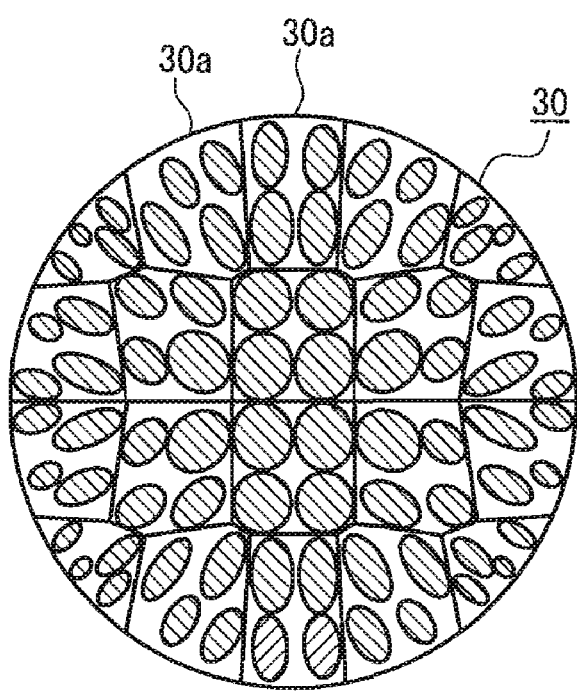
FIG. 5B is a front view showing a schematic configuration of a second lens array included in the projection display device.

FIG. 1A is a front view showing an overall configuration of a projection display device according to Embodiment 1 of the present invention. FIG. 1B is a bottom view showing an arrangement of light sources in FIG. 1A seen in a direction of an arrow A. FIG. 1C is a side view also showing the arrangement of the light sources seen in a direction of an arrow B. FIG. 2 is a cross-sectional view showing a schematic configuration of an ellipsoidal mirror. FIGS. 3 and 4 are cross-sectional views showing a schematic configuration of a focusing lens system. FIGS. 5A and 5B are front views showing schematic configurations of a first lens array and a second lens array, respectively.

The projection display device of the present embodiment uses reflection-type light valves 38a, 38b, and 38c as spatial light modulators for modulating incident light to form an image. Each of the reflection-type light valves 38a, 38b, and 38c has mirror elements arranged in a matrix on a pixel basis, and modulates a traveling direction of light depending on a video signal so as to form an optical image as a change in the reflection angle. As light sources for illuminating the reflection-type light valves 38a, 38b, and 38c with illumination light, four light sources 21a, 21b, 21c, and 21d, each being formed of an extra-high pressure mercury lamp, are used.

Ellipsoidal mirrors 22a, 22b, 22c, and 22d function as a first collective optical system. Light combiner prisms 23a and 23b function as a first light combiner optical system. Entrance-side lenses 24a and 24b and exit-side lenses 25a and 25b function as a second collective optical system. A light combiner prism 27 functions as a second light combiner optical system. Lenses 28, 31, 34, a first lens array 29, a second lens array 30, and total reflection mirrors 32 and 33 function as a third collective optical system.

Light beams output from the light sources 21a, 21b, 21c, and 21d are focused by the ellipsoidal mirrors 22a, 22b, 22c, and 22d, respectively, each having an ellipsoidal shape in cross section. Images of the light sources 21a, 21b, 21c, and 21d focused by the ellipsoidal mirrors 22a, 22b, 22c, and 22d, respectively, are formed on mirror surfaces of the corresponding light combiner prisms 23a and 23b to be reflected toward sides of focusing lens systems 26a and 26b, respectively (see FIG. 1B). Each of the light combiner prisms 23a and 23b has an isosceles triangular prism shape in cross section, and has on its light incident surface a dielectric multilayer mirror formed by laminating a low refractive index material and a high refractive index material alternately.

The exiting light beams from the light combiner prisms 23a and 23b travel as divergent light in a state where optical axes 41a and 41b of the collection light beams from the ellipsoidal mirrors 22a and 22b, respectively, and optical axes 41c and 41d of the focused light beams from the ellipsoidal mirrors 22c and 22d, respectively, are dose to each other, and are converted into collection light beams again by the respective corresponding focusing lens systems 26a and 26b as the second collective optical system composed of the entrance-side lenses 24a and 24b and the exit-side lenses 25a and 25b, respectively.

The light beams focused by the focusing lens systems 26a and 26b are reflected by a mirror surface of the second light combiner prism 27 toward a side of the third collective optical system 35 (see FIG. 1A) as divergent light again. The light combiner prism 27 has an isosceles triangular prism shape in cross section, and has on its light incident surface a dielectric multilayer mirror formed by laminating a low refractive index material and a high refractive index material alternately as the above-described light combiner prisms 23a and 23b.

The third collective optical system 35 includes the lens 28 with a positive power, the first lens array 29, the second lens array 30, the lens 31, the total reflection mirrors 32 and 33, and the lens 34, which are arranged in this order. The exiting divergent light from the light combiner prism 27 is converted into substantially parallel light by the lens 28 to be incident on the first lens array 29. The first lens array 29 is composed of many microlenses, and segments the images of the light sources so as to achieve illumination with high efficiency and high uniformity. The exiting light from the first lens array 29 passes through the second lens array 30 and the positive lens 31, and then is reflected by the total reflection mirrors 32 and 33 to be incident on the lens 34.

Exiting light from the lens 34 passes through a total reflection prism 36 to be incident on a color separating and combiner prism 37. The color separating and combiner prism 37 separates the white light into light beams of three primary colors of red, blue, and green, and the thus obtained illumination light beams are incident on the corresponding three light valves 38a, 38b, and 38c.

The three light valves 38a, 38b, and 38c modulate a traveling direction of the light depending on respective video signals so as to form an optical image. Reflected light beams from the light valves 38a, 38b, and 38c are synthesized into one beam again by the color separating and combiner prism 37, and the thus obtained light passes through the total reflection prism 36 to be magnified and projected by a projection lens 39.

Hereinafter, each of the above-described components of the projection display device of the present embodiment will be described in more detail.

Each of the ellipsoidal mirrors 22a, 22b, 22c, and 22d has a structure in which a dielectric optical multilayer film that allows infrared light to pass therethrough and reflects visible light is formed on an inner surface of a glass material.

The ellipsoidal shape of the ellipsoidal mirrors 22a, 22b, 22c, and 22d will be described with reference to FIG. 2. In FIG. 2, defining a distance from an apex of an ellipsoid 22 to a position where a center 21 of an illuminant of the light source is located as a first focal length $f_{E1}$, and a distance from the apex of the ellipsoid 22 to a position where the light emitted from the light source is focused to form the image of the illuminant as a second focal length $f_{E2}$, it is desirable that the first and second focal lengths $f_{E1}$ and $f_{E2}$ satisfy a relationship expressed by the following Formula (1).

$$8 \leq f_{E2}/f_{E1} \leq 11 \tag{1}$$

When the above numerical value is smaller than 8, the image of the illuminant of the light source is formed in the second focal length $f_{E2}$ at a higher magnification, resulting in a decrease in condensing efficiency. In order to compensate for the decrease in condensing efficiency, it is required to increase an effective area of all the downstream optical components. This makes the entire set larger, and thus it becomes difficult to configure the set with a compact size.

On the other hand, when the above numerical value is larger than 11, a collection angle at which the light is focused in the second focal length $f_{E2}$ becomes larger. Consequently, it is required to increase an effective diameter of the downstream lens systems, and also in this case, it becomes difficult to configure the set with a compact size.

Meanwhile, when the second focal length $f_{E2}$ is longer, an optical path length becomes longer. This makes it impossible to achieve a compact configuration on the periphery of the ellipsoidal mirrors 22a, 22b, 22c, and 22d.

When the first focal length $f_{E1}$ is shorter, the light sources 21a, 21b, 21c, and 21d are dose to the ellipsoidal mirrors 22a, 22b, 22c, and 22d, respectively. This makes it difficult for both the light sources 21a, 21b, 21c, and 21d and the ellipsoidal mirrors 22a, 22b, 22c, and 22d to satisfy a favorable cooling condition for ensuring reliability.

When the second focal length $f_{E2}$ is shorter, the ellipsoidal mirrors 22a, 22b, 22c, and 22d are dose to the downstream optical systems, which makes it difficult to configure a holding structure and a cooling structure.

It is more desirable that the above numerical value ($f_{E2}/f_{E1}$) is not less than 9 and not more than 10. When this condition is satisfied, condensing efficiency, compactness of the set, and a reasonable cooling structure can be all achieved.

On the light combiner prisms 23a and 23b and the light combiner prism 27, the light output from the light sources 21a, 21b, 21c, and 21d is focused in a minute area. Thus, the materials used for the multilayer film for forming the mirror surface need to have excellent heat resistance and ultraviolet resistance. Otherwise, the multilayer film surface may be cracked or deteriorated, and satisfactory reflectance may not be maintained.

In order to satisfy the above condition, the dielectric multilayer film is formed of an alternating periodic layer in which $SiO_2$ having a refractive index of 1.46 is used as a low refractive index layer, and $Ta_2O_5$ having a refractive index of 2.10 is used as a high refractive index layer. For the high refractive index material, a mixed material of $Ta_2O_5$ and $TiO_2$ also may be used.

For each of the entrance-side lenses 24a and 24b and the exit-side lenses 25a and 25b composing the focusing lens systems 26a and 26b, respectively, a plano-convex lens as shown in FIG. 3 is used that has a positive power and has an aspherical surface on one side so as to minimize a spherical aberration. These lenses each have an effective aperture, an aspherical shape, and a focal length equal to one another. The entrance-side lenses 24a and 24b convert divergent light into substantially parallel light, which then is converted into converged light by the exit-side lenses 25a and 25b.

As described above, the lenses have an aspherical convex surface, and each of the focusing lens systems 26a and 26b has its power divided by the two lenses, whereby an aberration caused by the lenses can be minimized.

Further, since the entrance-side lenses 24a and 24b and the exit-side lenses 25a and 25b are designed to have the same shape, the cost for the components can be kept low, and mass productivity can be achieved.

Here, a supplementary explanation will be given of the condition for synthesizing the light beams focused by the plurality of ellipsoidal mirrors efficiently with a compact configuration. FIG. 4 is a schematic diagram for explaining this. In FIG. 4, an optical axis 106a and an optical axis 103a correspond to the optical axis 41a of the ellipsoidal mirror 22a obtained after the light is reflected by the light combiner prism 23a and obtained after the light exits from the focusing lens system 26a, respectively. As shown in FIG. 4, the optical axis 103a is parallel to an optical axis 105a of the focusing lens system 26a.

It is desirable that the optical system shown in FIG. 4 is configured so that a relationship expressed by the following Formula (2) is satisfied in a plane including a normal line 104a to a reflecting surface of the light combiner prism 23a and the optical axis 41a of the ellipsoidal mirror 22a.

$$L1/3 \leq L2 \leq L1 \tag{2}$$

In this formula, L1 denotes a distance from a point of intersection of the optical axis 41a of the ellipsoidal mirror 22a and the optical axis 105a of the focusing lens system 26a on the light combiner prism 23a to a midpoint 102a between a light incident surface and a light exiting surface of the focusing lens system 26a. L2 denotes a distance from the point of intersection of the optical axis of the ellipsoidal mirror 22a and the optical axis 105a of the focusing lens system 26a to a position where the light beam 106a that is obtained by reflecting a light beam on the optical axis of the ellipsoidal mirror 22a by the light combiner prism 23a intersects the optical axis 105a of the focusing lens system 26a.

When L2 does not satisfy the above formula, the parallelism of the optical axis 103a of the ellipsoidal mirror 22a after the light exits from the focusing lens system 26a is deteriorated, resulting in a lower degree of convergence after the second light combiner prism 27, which will be described later.

When L2 is smaller than the lower limit, the optical axis 106a becomes higher relative to the focusing lens system 26a, which makes an aperture of the focusing lens system 26a too large. Thus, it is difficult to achieve downsizing.

Further, it is desirable that, defining L3 as a distance between a position 100a where the light on the optical axis 41a of the ellipsoidal mirror 22a is reflected and the optical axis 105a of the focusing lens system 26a, L2 and L3 satisfies a relationship expressed by the following Formulas (3).

$$L3/L2 = \tan \theta$$

$$5° \leq \theta \leq 20° \tag{3}$$

When θ is smaller than 5° or larger than 20°, it is difficult to achieve both the ensuring of favorable condensing efficiency and the downsizing of the entire set.

It is further desirable that L3 is within a dimensional range expressed by the following Formula (4).

$$1.2 \text{ mm} \leq L3 \leq 5 \text{ mm} \tag{4}$$

When L3 is smaller than the lower limit (1.2 mm), a larger amount of the light focused by the ellipsoidal mirror 22a gets out of the light combiner prism 23a, resulting in lower synthesizing efficiency. On the other hand, when L3 is larger than the upper limit (5 mm), the optical axis 106a becomes higher relative to the focusing lens system 26a, which makes the aperture of the focusing lens system 26a too large, and thus it is difficult to achieve downsizing.

Although the above description has been given taking the ellipsoidal mirror 22a as an example, the same applies to the ellipsoidal mirrors 22b, 22c, and 22d as well.

With the above-described configuration, the light beams focused by the plurality of ellipsoidal mirrors can be synthesized more efficiently with a more compact configuration.

In the above-described configuration, the optical axes 41a, 41b, 41c, and 41c of the light sources 21a, 21b, 21c, and 21d, respectively, are arranged so as to be parallel to one another.

Further, the light sources 21a and 21b as well as the ellipsoidal mirrors 22a and 22b are arranged axisymmetrically with respect to a vertical line from an apex to a base of the isosceles triangle of the cross-sectional shape of the corresponding light combiner prism 23a. Similarly, the light sources 21c and 21d as well as the ellipsoidal mirrors 22c and 22d are arranged axisymmetrically with respect to a vertical line from an apex to a base of the isosceles triangle of the cross-sectional shape of the corresponding light combiner prism 23b.

Further, a system composed of the light sources 21a and 21b, the ellipsoidal mirrors 22a and 22b, the light combiner prism 23a, and the focusing lens system 26a and a system composed of the light sources 21c and 21d, the ellipsoidal mirrors 22c and 22d, the light combiner prism 23b, and the focusing lens system 26b are arranged axisymmetrically with respect to a vertical line from an apex to a base of the isosceles triangle of the cross-sectional shape of the light combiner prism 27.

Further, the four optical axes formed in the optical systems after the four light sources 21a, 21b, 21c, and 21d are designed so as to be located at respective four corners of a substantially square shape in cross section when the light beams exit from the light combiner prism 27. In other words, the adjacent optical axes of the four optical axes are arranged so that the light beams are incident on the third collective optical system 35 at equal intervals to one another.

According to the above-described arrangement, even in the case of the optical system using the plurality of light sources, brightness non-uniformity is less likely to occur due to the symmetric illumination light beams. Further, the entire optical system can be configured with a compact size with no wasted space, and by arranging the same optical components symmetrically, a holding structure and a cooling structure also can be configured by using the common components.

In the above-described configuration, it is desirable that the relationship among the respective collective optical systems satisfies the following Formula (5).

$$(D_1/f_1) = (D_2/f_2) = (D_3/f_3) \tag{5}$$

In this formula, $D_1$ denotes an effective diameter of an aperture of each of the ellipsoidal mirrors 22a, 22b, 22c, and 22d on a light exiting side. $f_1$ denotes a distance from an aperture surface of each of the ellipsoidal mirrors 22a, 22b, 22c, and 22d on the light exiting side to a surface on which the light emitted from each of the light sources 21a, 21b, 21c, and 21d is focused in the smallest size. $D_2$ denotes an effective aperture of each of the entrance-side lenses 24a and 24b and the exit-side lenses 25a and 25b composing the focusing lens systems 26a and 26b, respectively. $f_2$ denotes a focal length of each of the entrance-side lenses 24a and 24b and the exit-side lenses 25a and 25b. $D_3$ denotes an effective aperture of the lens 28 composing the third collective optical system 35. $f_3$ denotes a focal length of the lens 28.

When the above condition is satisfied, favorable condensing efficiency can be achieved.

There is a tendency for the light incident on the first lens array 29 to be brightest in the vicinity of a center close to the optical axis and become dark rapidly toward the circumference. Thus, when the reflection-type light valves 38a, 38b, and 38c are illuminated with the light as it is, there remains brightness non-uniformity on the surface.

To avoid this, as shown in FIG. 5A, the first lens array 29 is configured such that an aperture shape of each segmented microlens 29a is taken as a secondary surface light source. Each of the microlenses 29a has an outer shape having the same aspect ratio as that of an effective display surface of each of the reflection-type light valves 38a, 38b, and 38c, and allows images of the light sources to be formed on a corresponding microlens 30a of the second lens array 30 so that the images are segmented into as many pieces as the number of the lens arrays. Consequently, the images of the illuminants of the four light sources 21a, 21b, 21c, and 21d are formed on each of the microlenses 30a.

In order to allow the images of the four illuminants to be arranged in an effective region of the second lens array 30 in a closely packed manner, an aperture shape of each of the microlenses 30a of the second lens array 30 is optimized in accordance with the position where the image of the illuminant is formed. This makes it possible to achieve favorable condensing efficiency without increasing an effective diameter of the second lens array 30.

The light output from the second lens array 30 illuminates each of the reflection-type light valves 38a, 38b, and 38c in a state where the images in shapes of the respective lenses of the first lens array 29 overlap each other by the second lens array 30 and the focusing lenses 31 and 34 (via the mirrors 32 and 33 along the path). With this configuration, it is possible to achieve uniform illumination with high condensing efficiency corresponding to the aspect ratio of each of the reflection-type light valves 38a, 38b, and 38c.

The total reflection prism 36 is composed of two prisms, and a very thin air layer is formed between proximity surfaces of the prisms. The angle of the air layer is set so that the illumination light is incident on the air layer at an angle equal to or larger than a critical angle, and is totally reflected therefrom to travel toward a side of the reflection-type light valves 38a, 38b, and 38c in an oblique direction, and the light reflected from the reflection-type light valves 38a, 38b, and 38c as a projected image is incident on and transmitted through the air layer at an angle equal to or smaller than a critical angle to be incident on the projection lens 39. Thus, by providing the total reflection prism 36, the entire projection optical system can be configured with a compact size.

The color separating and combiner prism 37 arranged between the total reflection prism 36 and the reflection-type light valves 38a, 38b, and 38c is composed of three prisms. A blue reflecting dichroic mirror and a red reflecting dichroic mirror are formed on proximity surfaces of the prisms, respectively.

The three reflection-type light valves 38a, 38b, and 38c are used for red, green, and blue light, respectively. The light from the total reflection prism 36 is first incident on the blue reflecting dichroic mirror so that only blue light is reflected thereby, and the thus obtained blue light is incident on the reflection-type light valve 38c for blue light. Then, the light transmitted through the blue reflecting dichroic mirror is incident on the red reflecting dichroic mirror so that only red light is reflected thereby, and the thus obtained red light is incident on the reflection-type light valve 38a for red light. Then, green light transmitted through both the blue reflecting dichroic mirror and the red reflecting dichroic mirror is incident on the reflection-type light valve 38b for green light. The light beams of three colors are reflected by the respective corresponding reflection-type light valves 38a, 38b, and 38c, and then are synthesized into one beam again by the blue reflecting dichroic mirror and the red reflecting dichroic mirror to be incident on the total reflection prism 36.

As described above, the white light is separated into the light beams of three primary colors of red, blue, and green, which then are synthesized, and the three reflection-type light valves 38a, 38b, and 38c corresponding to respective video signals are used, whereby a full-color high-definition projected image can be displayed.

Among the illumination light incident on the reflection-type light valves 38a, 38b, and 38c, light corresponding to a white image passes through the total reflection prism 36 and the projection lens 39 to be magnified and projected onto a screen (not shown). On the other hand, light corresponding to a black image travels outside of an effective diameter of the projection lens 39, and does not reach the screen.

In this case, the optical axes 41a, 41b, 41c, and 41d of the light sources 21a, 21b, 21c, and 21d, respectively, are arranged so as to be parallel to one another as described above and to be vertical to an optical axis 42 of the projection lens 39.

An arc lamp such as an extra-high pressure mercury lamp used as the light sources 21a, 21b, 21c, and 21d can ensure sufficient reliability and life when in use in a direction of rotation with respect to the optical axes 41a, 41b, 41c, and 41d. However, when the lamp is used in a state of being tilted in directions other than the above, a significant decrease in reliability and life is expected in many cases. In general, a projection display device often is placed so as to project an image in a direction of rotation with respect to a horizontal axis of the set. According to the arrangement of the present embodiment, reliability and life can be ensured in any posture as long as the image is projected in a direction of rotation with respect to a horizontal axis of the set.

Embodiment 2

Figure 6A:
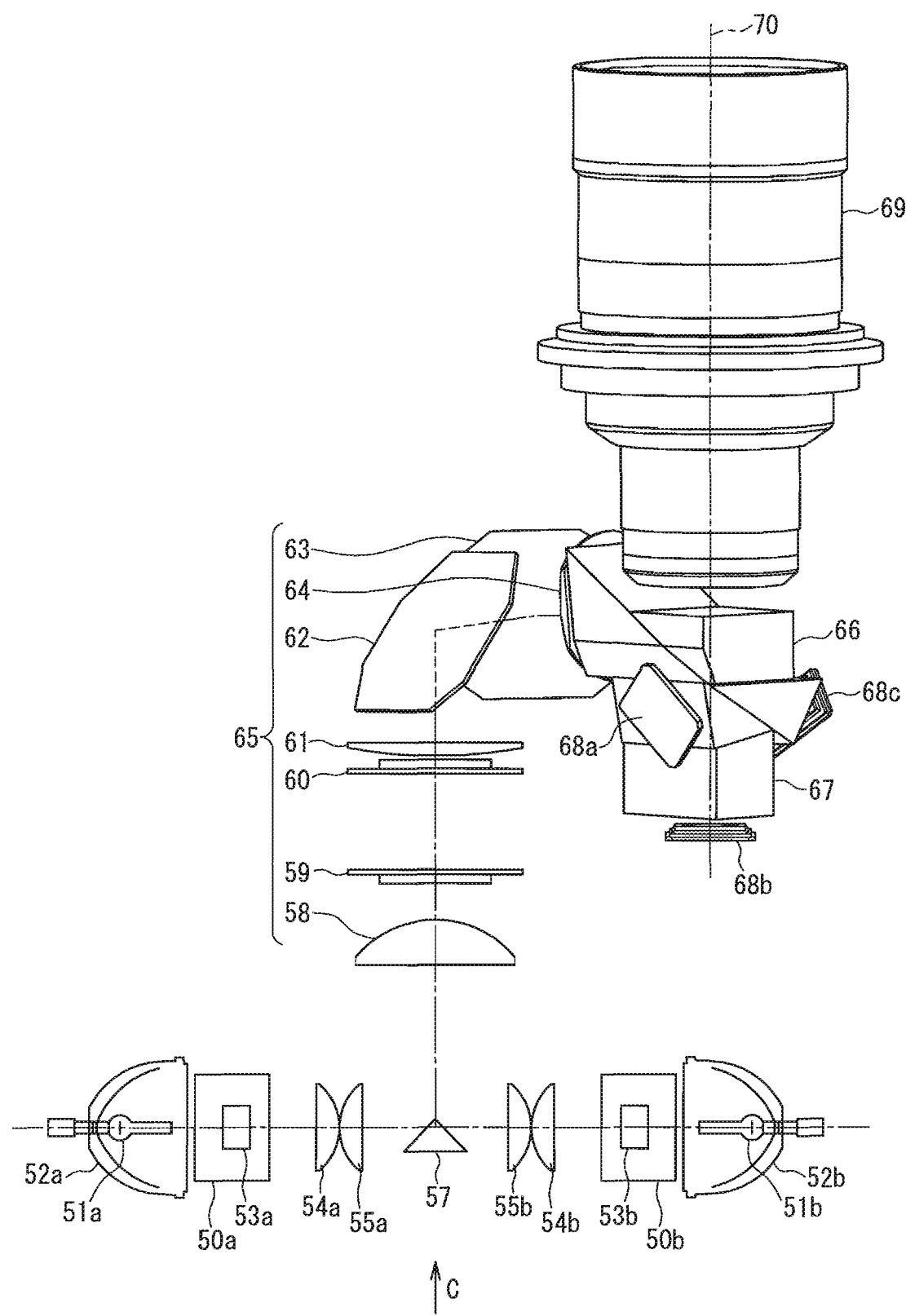
FIG. 6A is a front view showing an overall configuration of a projection display device according to Embodiment 2 of the present invention.
Figure 6B:
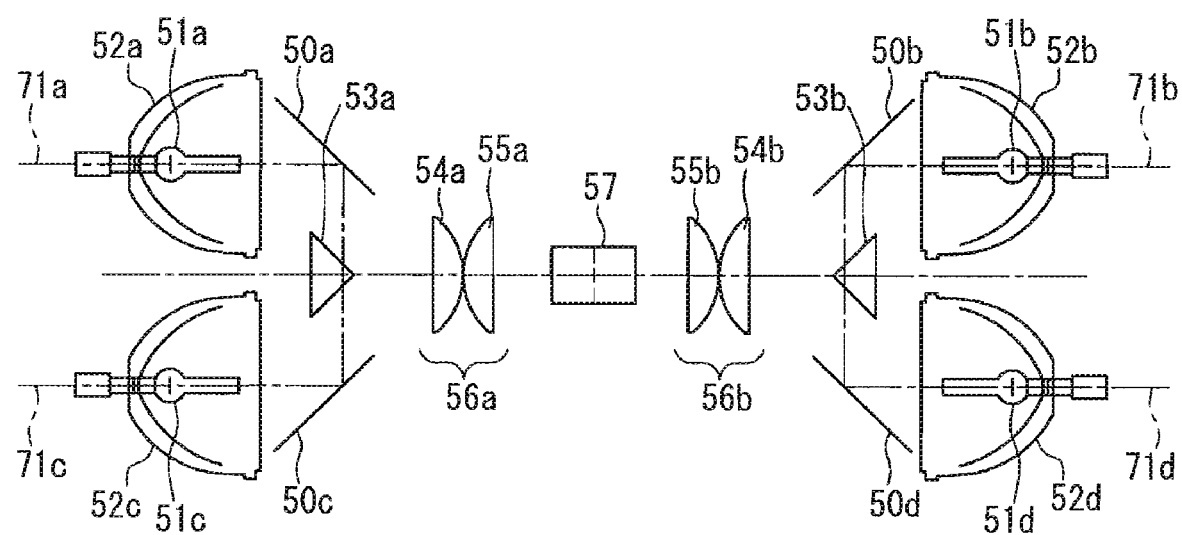
FIG. 6B is a bottom view showing an arrangement of light sources in FIG. 6A seen in a direction of an arrow C.

FIG. 6A is a front view showing an overall configuration of a projection display device according to Embodiment 2 of the present invention. FIG. 6B is a bottom view showing an arrangement of light sources seen in a direction of an arrow C.

Reflection-type light valves 68a, 68b, and 68c are used as spatial light modulators. Each of the reflection-type light valves has mirror elements arranged in a matrix on a pixel basis, and modulates a traveling direction of light depending on a video signal so as to form an optical image as a change in the reflection angle. An extra-high pressure mercury lamp is used as each of four light sources 51a, 51b, 51c, and 51d.

Ellipsoidal mirrors 52a, 52b, 52c, and 52d function as a first collective optical system. Light combiner prisms 53a and 53b function as a first light combiner optical system. Entrance-side lenses 54a and 54b and exit-side lenses 55a and 55b function as a second collective optical system. A light combiner prism 57 functions as a second light combiner optical system. Lenses 58, 61, 64, a first lens array 59, a second lens array 60, and total reflection mirrors 62 and 63 function as a third collective optical system.

Light beams output from the light sources 51a, 51b, 51c, and 51d are focused by the ellipsoidal mirrors 52a, 52b, 52c, and 52d, respectively, each having an ellipsoidal shape in cross section, via corresponding cold mirrors 50a, 50b, 50c, and 50d. Each of the cold mirrors 50a, 50b, 50c, and 50d has a structure in which a dielectric multilayer film that reflects visible light and allows ultraviolet light and infrared light to pass therethrough is formed on a surface of a transparent glass plate. According to the above-described arrangement, it is required to consider light resistance and cooling only for the surroundings of the cold mirrors 50a, 50b, 50c, and 50d, and it is less required to consider light resistance and heat resistance concerning ultraviolet light and infrared light since only visible light reaches the downstream optical components.

Images of the light sources 51a, 51b, 51c, and 51d focused by the ellipsoidal mirrors 52a, 52b, 52c, and 52d, respectively, are formed on mirror surfaces of the respective corresponding first light combiner prisms 53a and 53b via the cold mirrors 50a, 50b, 50c, and 50d to be reflected toward sides of focusing lens systems 56a and 56b, respectively. Each of the first light combiner prisms 53a and 53b has an isosceles triangular prism shape in cross section, and has on its light incident surface a dielectric multilayer mirror formed by laminating a low refractive index material and a high refractive index material alternately.

The exiting light beams from the light combiner prisms 53a and 53b travel as divergent light in a state where optical axes 71a and 71b of the collection light beams from the ellipsoidal mirrors 52a and 52b, respectively, and optical axes 71c and 71d of the focused light beams from the ellipsoidal mirrors 52c and 52d, respectively, are close to each other, and then are converted into collection light beams again by the respective corresponding focusing lens systems 56a and 56b as the second collective optical system composed of the entrance-side lenses 54a and 54b and the exit-side lenses 55a and 55b, respectively.

The light beams focused by the focusing lens systems 56a and 56b are reflected by a mirror surface of the second light combiner prism 57 toward a side of the third collective optical system 65 as divergent light again. The prism 57 also has an isosceles triangular prism shape in cross section, and has on its light incident surface a dielectric multilayer mirror formed by laminating a low refractive index material and a high refractive index material alternately.

The third collective optical system 65 includes the lenses 58, 61, and 64 with a positive power, the first lens array 59, the second lens array 60, the lens 61, the total reflection mirrors 62 and 63, and the lens 64, which are arranged in this order. The exiting divergent light from the light combiner prism 57 is converted into substantially parallel light by the lens 58 to be incident on the first lens array 59. The first lens array 59 segments the images of the light sources so as to achieve illumination with high efficiency and high uniformity. The exiting light from the first lens array 59 passes through the second lens array 60 and the positive lens 61, and then is reflected by the total reflection mirrors 62 and 63 to be incident on the lens 64.

Exiting light from the lens 64 passes through a total reflection prism 66 to be incident on a color separating and combiner prism 67. The color separating and combiner prism 67 separates the white light into light beams of three primary colors of red, blue, and green, and the thus obtained illumination light beams are incident on the corresponding three light valves 68a, 68b, and 68c.

The three light valves 68a, 68b, and 68c modulate a traveling direction of the light depending on respective video signals so as to form an optical image. Reflected light beams from the light valves 68a, 68b, and 68c are synthesized into one beam again by the color separating and combiner prism 67, and the thus obtained light passes through the total reflection prism 66 to be magnified and projected by a projection lens 69.

Hereinafter, each of the above-described components of the projection display device of the present embodiment will be described in more detail.

It is desirable that the ellipsoidal shape of each of the ellipsoidal mirrors 52a, 52b, 52c, and 52d satisfies the condition expressed by the Formula (1) like the ellipsoidal mirrors 22a, 22b, 22c, and 22d in Embodiment 1.

Also in the present embodiment, when the value of $f_{E2}/f_{E1}$ in the Formula (1) is smaller than 8, the image of an illuminant of the light source is formed in the second focal length $f_{E2}$ at a higher magnification, resulting in a decrease in condensing efficiency. Thus, in order to compensate for the decrease in condensing efficiency, it is required to increase an effective area of all the downstream optical components. This makes the entire set larger, and thus it becomes difficult to configure the set with a compact size.

On the other hand, when the above numerical value is larger than 11, a collection angle at which the light is focused in the second focal length $f_{E2}$ becomes larger. Consequently, it is required to increase an effective diameter of the downstream lens systems, and also in this case, it becomes difficult to configure the set with a compact size.

Meanwhile, when the second focal length $f_{E2}$ is longer, an optical path length becomes longer. This similarly makes it impossible to achieve a compact configuration on the periphery of the ellipsoidal mirrors 52a, 52b, 52c, and 52d.

When the first focal length $f_{E1}$ is shorter, the light sources 51a, 51b, 51c, and 51d are close to the ellipsoidal mirrors 52a, 52b, 52c, and 52d, respectively. This makes it difficult for both the light sources 51a, 51b, 51c, and 51d and the ellipsoidal mirrors 52a, 52b, 52c, and 52d to satisfy a favorable cooling condition for ensuring reliability.

When the second focal length $f_{E2}$ is shorter, the ellipsoidal mirrors 52a, 52b, 52c, and 52d are close to the downstream optical systems, which makes it difficult to configure a holding structure and a cooling structure.

For each of the entrance-side lenses 54a and 54b and the exit-side lenses 55a and 55b composing the focusing lens systems 56a and 56b, respectively, a plano-convex lens as in Embodiment 1 is used that has a positive power and has an aspherical surface on one side so as to minimize a spherical aberration. The lenses each have an effective aperture, an aspherical shape, and a focal length equal to one another. The entrance-side lenses 54a and 54b convert divergent light into substantially parallel light, which then is converted into converged light by the exit-side lenses 55a and 55b.

In the above-described configuration, the optical axes 71a, 71b, 71c, and 71d of the light sources 51a, 51b, 51c, and 51d, respectively, are arranged so as to be parallel to one another.

Further, the light sources 51a and 51c, the ellipsoidal mirrors 52a and 52c, as well as the cold mirrors 50a and 50c are arranged axisymmetrically with respect to a vertical line from an apex to a base of the isosceles triangle of the cross-sectional shape of the corresponding light combiner prism 53a. Similarly, the light sources 51b and 51d, the ellipsoidal mirrors 52b and 52d, as well as the cold mirrors 50b and 50d are arranged axisymmetrically with respect to a vertical line from an apex to a base of the isosceles triangle of the cross-sectional shape of the corresponding light combiner prism 53b.

Further, a system composed of the light sources 51a and 51c, the ellipsoidal mirrors 52a and 52c, the cold mirrors 50a and 50c, the light combiner prism 53a, and the focusing lens system 56a and a system composed of the light sources 51b and 51d, the ellipsoidal mirrors 52b and 52d, the cold mirrors 50b and 50d, the light combiner prism 53b, and the focusing lens system 56b are arranged axisymmetrically with respect to a vertical line from an apex to a base of the isosceles triangle of the cross-sectional shape of the light combiner prism 57.

Further, also in the case of the present embodiment, the four optical axes formed in the optical systems after the four light sources 51a, 51b, 51c, and 51d are designed so as to be located at respective four corners of a substantially square shape in cross section when the light beams exit from the light combiner prism 57. In other words, the adjacent optical axes of the four optical axes are arranged so that the light beams are incident on the third collective optical system 65 at equal intervals to one another.

According to the above-described arrangement, even in the case of the optical system using the plurality of light sources, brightness non-uniformity is less likely to occur due to the symmetric illumination light beams. Further, the entire optical system can be configured with a compact size with no wasted space, and by arranging the same optical components symmetrically, a holding structure and a cooling structure also can be configured by using the common components.

Also in the case of the present embodiment, it is desirable that the relationship among the respective collective optical systems satisfies the above-described Formula (5) so as to ensure favorable condensing efficiency.

In this case, $D_1$ denotes an effective diameter of an aperture of each of the ellipsoidal mirrors 52a, 52b, 52c, and 52d on a light exiting side. $f_1$ denotes a distance from an aperture surface of each of the ellipsoidal mirrors 52a, 52b, 52c, and 52d on the light exiting side to a surface on which the light emitted from each of the light sources 51a, 51b, 51c, and 51d is focused in the smallest size. $D_2$ denotes an effective aperture of each of the entrance-side lenses 54a and 54b and the exit-side lenses 55a and 55b composing the focusing lens systems 56a and 56b, respectively. $f_2$ denotes a focal length of each of the entrance-side lenses 54a and 54b and the exit-side lenses 55a and 55b. $D_3$ denotes an effective aperture of the lens 58 composing the third collective optical system 65. $f_3$ denotes a focal length of the lens 58.

The first lens array 59 is configured such that an aperture shape of each segmented lens is taken as a secondary surface light source. Each of the lenses of the first lens array 59 has an outer shape having the same aspect ratio as that of an effective display surface of each of the reflection-type light valves 68a, 68b, and 68c, and allows images of the light sources to be formed on a corresponding lens of the second lens array 60 so that the images are segmented into as many pieces as the number of the lens arrays. Consequently, the images of the illuminants of the four light sources 51a, 51b, 51c, and 51d are formed on each of the lenses of the second lens array 60.

In order to allow the images of the four illuminants to be arranged in an effective region of the second lens array 60 in a closely packed manner, an aperture shape of each of the lenses of the second lens array 60 is optimized in accordance with the position where the image of the illuminant is formed. This makes it possible to achieve favorable condensing efficiency without increasing an effective diameter of the second lens array 60.

The light output from the second lens array 60 illuminates each of the reflection-type light valves 68a, 68b, and 68 in a state where the images in shapes of the respective lenses of the first lens array 59 overlap each other by the second lens array 60 and the focusing lenses 61 and 64 via the mirrors 62 and 63 along the path.

With this configuration as in Embodiment 1, it is possible to achieve uniform illumination with high condensing efficiency corresponding to the aspect ratio of each of the reflection-type light valves 68a, 68b, and 68.

The total reflection prism 66 is composed of two prisms, and a very thin air layer is formed between proximity surfaces of the prisms. The angle of the air layer is set so that the illumination light is incident on the air layer at an angle equal to or larger than a critical angle, and is totally reflected therefrom to travel toward a side of the reflection-type light valves 68a, 68b, and 68c in an oblique direction, and the light reflected from the reflection-type light valves 68a, 68b, and 68c as a projected image is incident on and transmitted through the air layer at an angle equal to or smaller than a critical angle to be incident on the projection lens 69. Thus, by providing the total reflection prism 66, the entire projection optical system can be configured with a compact size.

The color separating and combiner prism 67 arranged between the total reflection prism 66 and the reflection-type light valves 68a, 68b, and 68c is composed of three prisms. A blue reflecting dichroic mirror and a red reflecting dichroic mirror are formed on proximity surfaces of the prisms, respectively.

The three reflection-type light valves 68a, 68b, and 68c are used for red, green, and blue light, respectively. The light from the total reflection prism 66 is first incident on the blue reflecting dichroic mirror so that only blue light is reflected thereby, and the thus obtained blue light is incident on the reflection-type light valve 68c for blue light. Then, the light transmitted through the blue reflecting dichroic mirror is incident on the red reflecting dichroic mirror so that only red light is reflected thereby, and the thus obtained red light is incident on the reflection-type light valve 68a for red light. Then, green light transmitted through both the blue reflecting dichroic mirror and the red reflecting dichroic mirror is incident on the reflection-type light valve 68b for green light. The light beams of three colors are reflected by the respective corresponding reflection-type light valves 68a, 68b, and 68c, and then are synthesized into one beam again by the blue reflecting dichroic mirror and the red reflecting dichroic mirror to be incident on the total reflection prism 66.

As described above, the white light is separated into the light beams of three primary colors of red, blue, and green, which then are synthesized, and the three reflection-type light valves 68a, 68b, and 68c corresponding to respective video signals are used, whereby a full-color high-definition projected image can be displayed.

Among the illumination light incident on the reflection-type light valves 68a, 68b, and 68c, light corresponding to a white image passes through the total reflection prism 66 and the projection lens 69 to be magnified and projected onto a screen (not shown). On the other hand, light corresponding to a black image travels outside of an effective diameter of the projection lens 69, and does not reach the screen.

In this case, the optical axes 71a, 71b, 71c, and 71d of the light sources 51a, 51b, 51c, and 51d, respectively, are arranged so as to be parallel to one another as described above and to be vertical to an optical axis 70 of the projection lens 69.

Embodiment 3

Figure 7A:
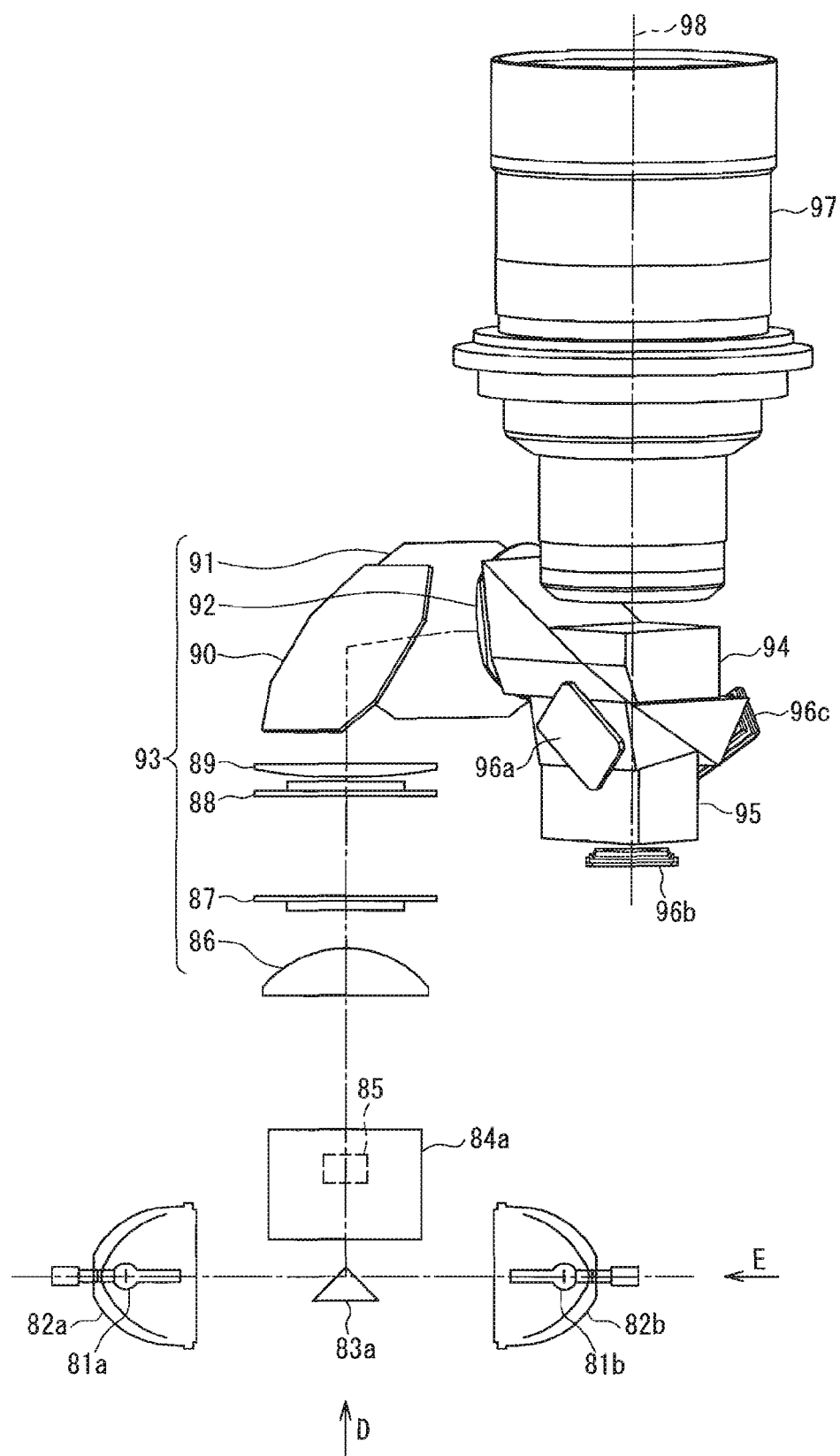
FIG. 7A is a front view showing an overall configuration of a projection display device according to Embodiment 3 of the present invention.
Figure 7B:
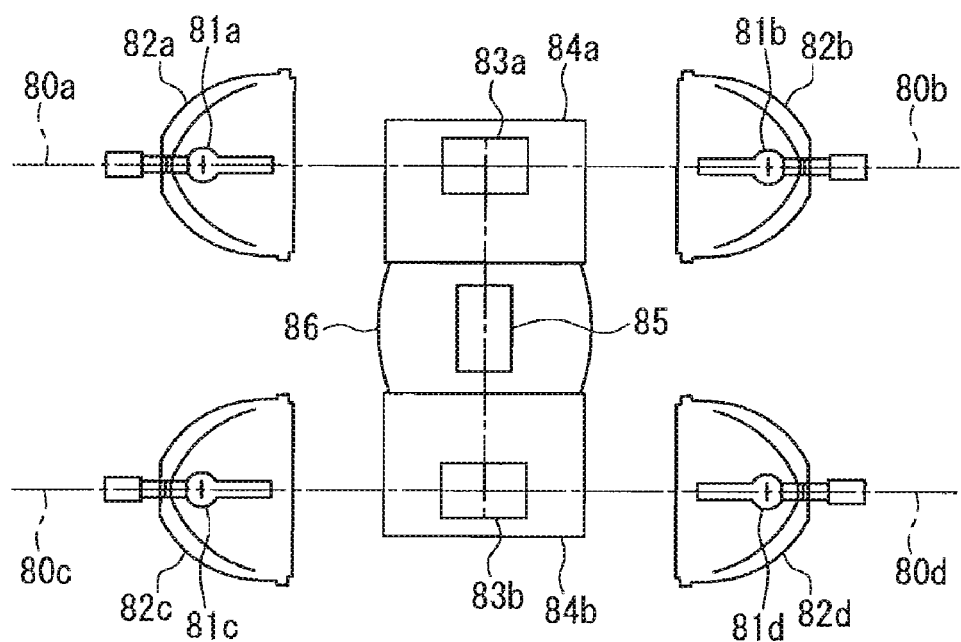
FIG. 7B is a bottom view showing an arrangement of light sources in FIG. 7A seen in a direction of an arrow D.
Figure 7C:
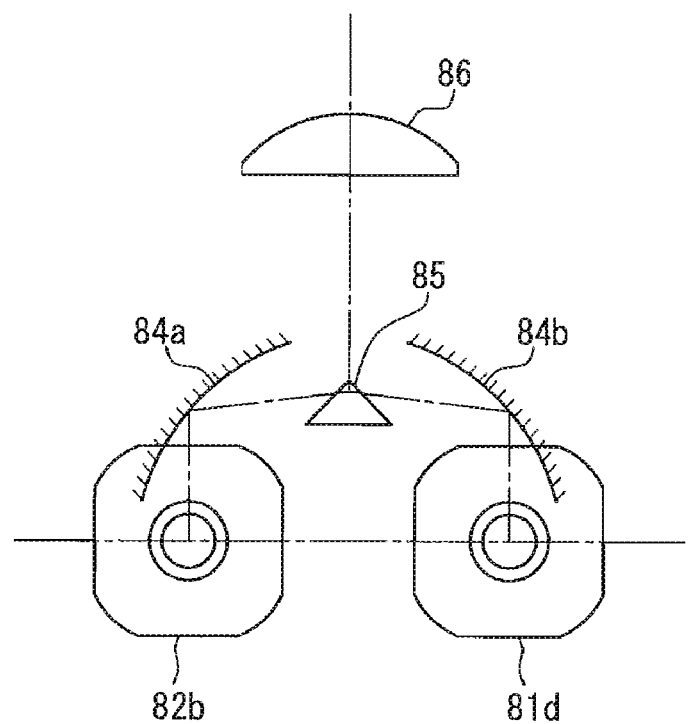
FIG. 7C is a side view showing the arrangement of the light sources in FIG. 7A seen in a direction of an arrow E.

FIG. 7A is a front view showing an overall configuration of a projection display device according to Embodiment 3 of the present invention. FIG. 7B is a bottom view showing an arrangement of light sources seen in a direction of an arrow D. FIG. 7C is a side view showing the arrangement of the light sources seen in a direction of an arrow E.

Reflection-type light valves 96a, 96b, and 96c are used as spatial light modulators. Each of the reflection-type light valves has mirror elements arranged in a matrix on a pixel basis, and modulates a traveling direction of light depending on a video signal so as to form an optical image as a change in the reflection angle. An extra-high pressure mercury lamp is used as each of four light sources 81a, 81b, 81c, and 81d.

Ellipsoidal mirrors 82a, 82b, 82c, and 82d function as a first collective optical system. Light combiner prisms 83a and 83b function as a first light combiner optical system. Concave mirrors 84a and 84b function as a second collective optical system. A light combiner prism 85 functions as a second light combiner optical system. Lenses 86, 89, 92, a first lens array 87, a second lens array 88, and total reflection mirrors 90 and 91 function as a third collective optical system.

Light beams output from the light sources 81a, 81b, 81c, and 81d are focused by the ellipsoidal mirrors 82a, 82b, 82c, and 82d, respectively, each having an ellipsoidal shape in cross section. Images of the light sources 81a, 81b, 81c, and 81d focused by the ellipsoidal mirrors 82a, 82b, 82c, and 82d, respectively, are formed on mirror surfaces of the respective corresponding first light combiner prisms 83a and 83b to be reflected toward sides of the concave mirrors 84a and 84b, respectively. Each of the first light combiner prisms 83a and 83b has an isosceles triangular prism shape in cross section, and has on its light incident surface a dielectric multilayer mirror formed by laminating a low refractive index material and a high refractive index material alternately.

The exiting light beams from the first light combiner prisms 83a and 83b travel as divergent light in a state where optical axes 80a and 80b of the collection light beams from the ellipsoidal mirrors 82a and 82b, respectively, and optical axes 80c and 80d of the focused light beams from the ellipsoidal mirrors 82c and 82d, respectively, are close to each other, and then are converted into collection light beams again by the respective corresponding concave mirrors 84a and 84b.

The light beams focused by the concave mirrors 84a and 84b are reflected by a mirror formation surface of the second light combiner prism 85 toward a side of the third collective optical system 93 as divergent light again. The second light combiner prism 85 has an isosceles triangular prism shape in cross section, and has on its light incident surface a dielectric multilayer mirror formed by laminating a low refractive index material and a high refractive index material alternately as the first light combiner prisms 83a and 83b.

The third collective optical system 93 includes the lens 86 with a positive power, the first lens array 87, the second lens array 88, the lens 89 with a positive power, the total reflection mirrors 90 and 91, and the lens 92 with a positive power, which are arranged in this order. The exiting divergent light from the second light combiner prism 85 is converted into substantially parallel light by the lens 86 to be incident on the first lens array 87. The first lens array 87 segments the images of the light sources so as to achieve illumination with high efficiency and high uniformity. The exiting light from the first lens array 87 passes through the second lens array 88 and the positive lens 89, and then is reflected by the total reflection mirrors 90 and 91 to be incident on the lens 92.

Exiting light from the lens 92 passes through a total reflection prism 94 to be incident on a color separating and combiner prism 95. The color separating and combiner prism 95 separates the white light into light beams of three primary colors of red, blue, and green, and the thus obtained illumination light beams are incident on the corresponding three light valves 96a, 96b, and 96c.

The three light valves 96a, 96b, and 96c modulate a traveling direction of the light depending on respective video signals so as to form an optical image. Reflected light beams from the light valves 96a, 96b, and 96c are synthesized into one beam again by the color separating and combiner prism 95, and the thus obtained light passes through the total reflection prism 94 to be magnified and projected by a projection lens 97.

Hereinafter, each of the above-described components of the projection display device of the present embodiment will be described in more detail.

Each of the ellipsoidal mirrors 82a, 82b, 82c, and 82d has a structure in which a dielectric optical multilayer film that allows infrared light to pass therethrough and reflects visible light is formed on an inner surface of a glass material. It is desirable that the ellipsoidal shape satisfies the condition expressed by the above-described Formula (1) as in Embodiment 1.

Also in the present embodiment, when the value of $f_{E2}/f_{E1}$ in the Formula (1) is smaller than 8, the image of an illuminant of the light source is formed in the second focal length $f_{E2}$ at a higher magnification, resulting in a decrease in condensing efficiency. Thus, in order to compensate for the decrease in condensing efficiency, it is required to increase an effective area of all the downstream optical components. This makes the entire set larger, and thus it becomes difficult to configure the set with a compact size.

On the other hand, when the above numerical value is larger than 11, a collection angle at which the light is focused in the second focal length $f_{E2}$ becomes larger. Consequently, it is required to increase an effective diameter of the downstream lens systems, and also in this case, it becomes difficult to configure the set with a compact size.

Meanwhile, when the second focal length $f_{E2}$ is longer, an optical path length becomes longer. This similarly makes it impossible to achieve a compact configuration on the periphery of the ellipsoidal mirrors 82a, 82b, 82c, and 82d.

When the first focal length $f_{E1}$ is shorter, the light sources 81a, 81b, 81c, and 81d are close to the ellipsoidal mirrors 82a, 82b, 82c, and 82d, respectively. This makes it difficult for both the light sources 81a, 81b, 81c, and 81d and the ellipsoidal mirrors 82a, 82b, 82c, and 82d to satisfy a favorable cooling condition for ensuring reliability.

When the second focal length $f_{E2}$ is shorter, the ellipsoidal mirrors 82a, 82b, 82c, and 82d are close to the downstream optical systems, which makes it difficult to configure a holding structure and a cooling structure.

Further, it is desirable that the above numerical value is not less than 9 and not more than 10. When this condition is satisfied, condensing efficiency, compactness of the set, and a reasonable cooling structure all can be achieved.

Figure 8:
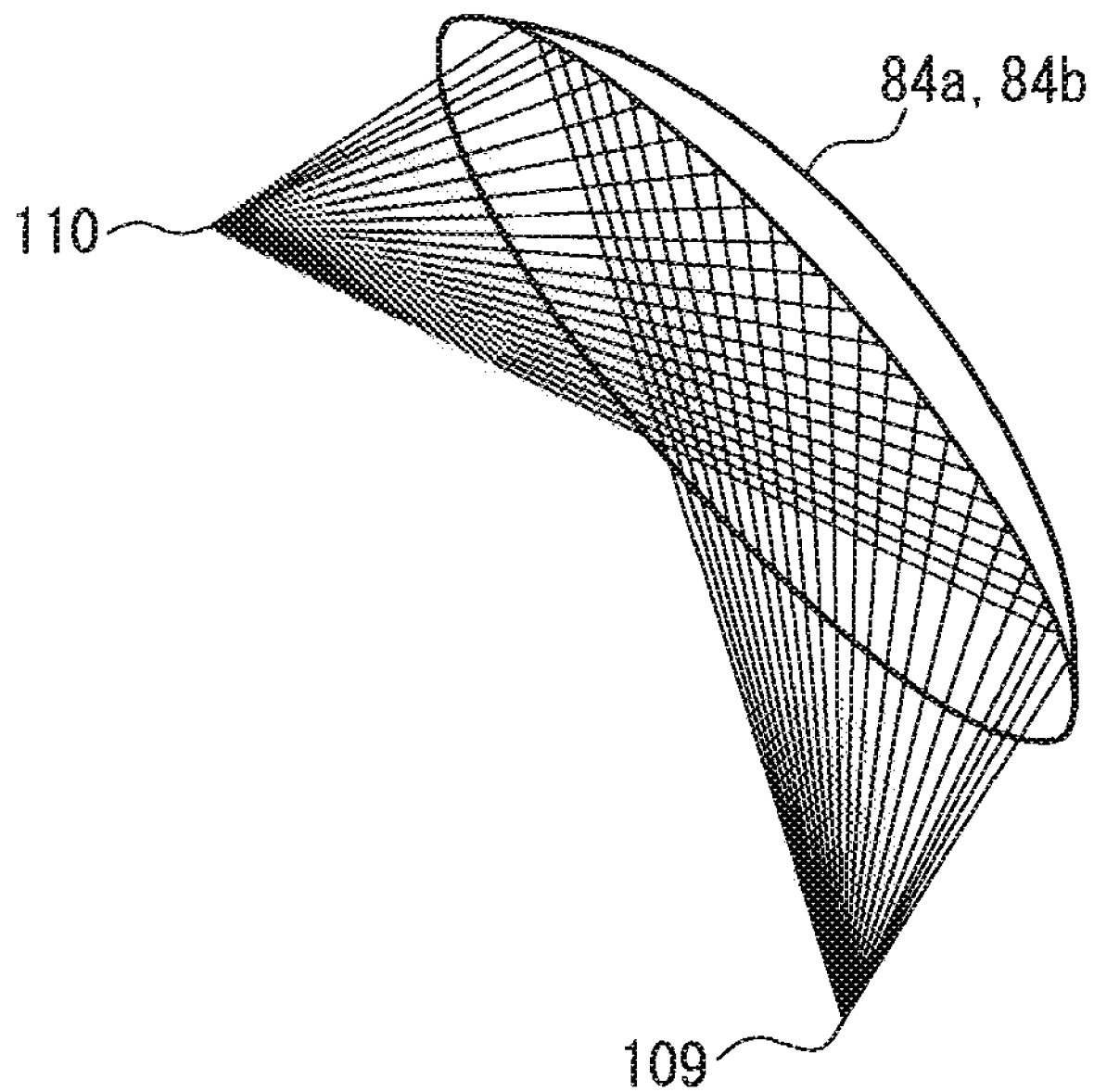
FIG. 8 is a diagram for explaining a structure of a concave mirror of the projection display device according to Embodiment 3 of the present invention.

Next, a description will be given of an ellipsoidal shape of each of the concave mirrors 84a and 84b with reference to FIGS. 8 and 9. Each of the concave mirrors 84a and 84b has an anamorphic aspherical shape in which a light incident surface is not rotationally symmetric with respect to an optical axis. As shown in FIG. 8, a mirror formation surface has a focal length that is changed continuously depending on an incident angle of each of the divergent light beams, so that the exiting divergent light beams from an exiting point 109 of each of the first light combiner prisms 83a and 83b on an optical axis thereof are focused on an incident point 110 of the second light combiner prism 85 as converged light again.

Figure 9:
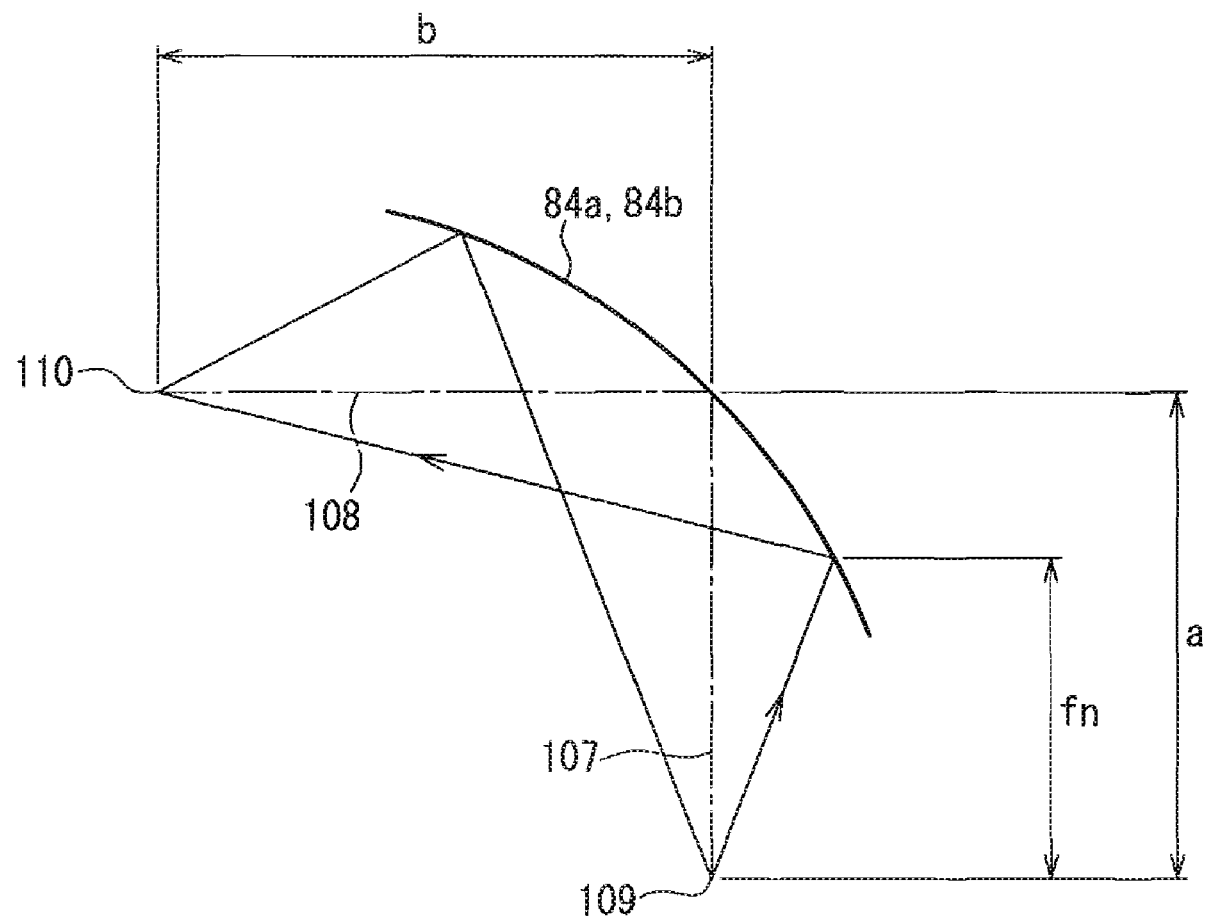
FIG. 9 is a diagram for explaining details of the structure of the concave mirror.

With reference to FIG. 9, a cross-sectional shape of each of the concave mirrors 84a and 84b will be described. FIG. 9 shows a cross-sectional shape on a plane including an optical axis 107 of the incident light and an optical axis 108 of the exiting light. As shown in the figure, defining "a" as a distance from the exiting point 109 to a point of intersection of the incident optical axis 107 and the exiting optical axis 108, and "b" as a distance from the point of intersection to the incident point 110, a total sum of "a" and "b" is defined to be $L_0$.

Further, $L_n$ is defined as a distance for which an arbitrary exiting light beam from the exiting point 109 travels from the exiting point 109 through the concave mirrors 84a and 84b to the incident point 110 of the second light combiner prism 85, the distance being in a direction parallel to the optical axis of the light. Defining $f_n$ as a focal length at an arbitrary light incident point, the focal length is changed so that the relationship between $L_0$ and $f_n$ satisfies the following Formula (6).

$$f_n = L_n(L_0 - L_m)/L_0 \qquad (6)$$

The focal length of the mirror formation surface is changed continuously in each of a first cross-sectional shape on the plane including the optical axis 107 of the incident light exiting from the first light combiner prisms 83a and 83b and the optical axis 108 of the exiting light reflected by the concave mirror, and a second cross-sectional shape in a direction vertical to the first cross-sectional shape. Further, the first cross-sectional shape and the second cross-sectional shape are anamorphic aspherical shapes that are different from each other.

On the mirror formation surface of each of the concave mirrors 84a and 84b, a dielectric multilayer film formed of an alternating periodic layer of a low refractive index layer of $SiO_2$ and a high refractive index layer of $Nb_2O_5$ is formed, and this film has a property of allowing most ultraviolet light and infrared light to pass therethrough and reflecting only visible light.

In order to ensure reliability of the reflection-type light valves 96a, 96b, and 96c, ultraviolet light and infrared light emitted from the light sources 81a, 81b, 81c, and 81d along with visible light has to be cut before the light reaches the reflection-type light valves 96a, 96b, and 96c. Since the concave mirrors 84a and 84b are provided with this function, there is no need to provide an additional optical component for cutting ultraviolet light and infrared light, and thus the number of components can be suppressed.

For the material of the high refractive index layer, $TiO_2$ and $Ta_2O_5$ also may be used in addition to $Nb_2O_5$.

A substrate of each of the concave mirrors 84a and 84b is made of a glass material formed in a molding process. When the substrate is molded with a peripheral holding structure into an integral shape, the number of components can be reduced further.

In the above-described configuration, the optical axes 80a, 80b, 80c, and 80c of the light sources 81a, 81b, 81c, and 81d, respectively, are arranged so as to be parallel to one another.

Further, the light sources 81a and 81b as well as the ellipsoidal mirrors 82a and 82b are arranged axisymmetrically with respect to a vertical line from an apex to a base of the isosceles triangle of the cross-sectional shape of the corresponding first light combiner prism 83a. Similarly, the light sources 81c and 81d as well as the ellipsoidal mirrors 82c and 82d are arranged axisymmetrically with respect to a vertical line from an apex to a base of the isosceles triangle of the cross-sectional shape of the corresponding first light combiner prism 83b.

Further, a system composed of the light sources 81a and 81b, the ellipsoidal mirrors 82a and 82b, the first light combiner prism 83a, and the concave mirror 84a and a system composed of the light sources 81c and 81d, the ellipsoidal mirrors 82c and 82d, the first light combiner prism 83b, and the concave mirror 84b are arranged axisymmetrically with respect to a vertical line from an apex to a base of the isosceles triangle of the cross-sectional shape of the second light combiner prism 85.

Further, the four optical axes formed in the optical systems after the four light sources 81a, 81b, 81c, and 81d are designed so as to be located at respective four corners of a substantially square shape in cross section when the light beams exit from the light combiner prism 85. In other words, the adjacent optical axes of the four optical axes are arranged so that the light beams are incident on the third collective optical system 93 at equal intervals to one another.

According to the above-described arrangement, even in the case of the optical system using the plurality of light sources, brightness non-uniformity is less likely to occur due to the symmetric illumination light beams. Further, the entire optical system can be configured with a compact size with no wasted space, and by arranging the same optical components symmetrically, a holding structure and a cooling structure also can be configured by using the common components.

The first lens array 87 is configured such that an aperture shape of each segmented lens is taken as a secondary surface light source. Each of the lenses of the first lens array 87 has an outer shape having the same aspect ratio as that of an effective display surface of each of the reflection-type light valves 96a, 96b, and 96c, and allows images of the light sources to be formed on a corresponding lens of the second lens array 88 so that the images are segmented into as many pieces as the number of the lens arrays. Consequently, the images of the illuminants of the four light sources 81a, 81b, 81c, and 81d are formed on each of the lenses of the second lens array 88.

In order to allow the images of the four illuminants to be arranged in an effective region of the second lens array 88 in a closely packed manner, an aperture shape of each of the lenses of the second lens array 88 is optimized in accordance with the position where the image of the illuminant is formed. This makes it possible to achieve favorable condensing efficiency without increasing an effective diameter of the second lens array 88.

The light output from the second lens array 88 illuminates each of the reflection-type light valves 96a, 96b, and 96c in a state where the images in shapes of the respective lenses of the first lens array 87 overlap each other by the second lens array 88 and the lenses 89 and 92 via the mirrors 90 and 91 along the path. With this configuration as in Embodiment 1, it is possible to achieve uniform illumination with high condensing efficiency corresponding to the aspect ratio of each of the reflection-type light valves 96a, 96b, and 96c.

The total reflection prism 94 is composed of two prisms, and a very thin air layer is formed between proximity surfaces of the prisms. The angle of the air layer is set so that the illumination light is incident on the air layer at an angle equal to or larger than a critical angle, and is totally reflected therefrom to travel toward a side of the reflection-type light valves 96a, 96b, and 96c in an oblique direction, and the light reflected from the reflection-type light valves 96a, 96b, and 96c as a projected image is incident on and transmitted through the air layer at an angle equal to or smaller than a critical angle to be incident on the projection lens 97. Thus, by providing the total reflection prism 94, the entire projection optical system can be configured with a compact size.

The color separating and combiner prism 95 arranged between the total reflection prism 94 and the reflection-type light valves 96a, 96b, and 96c is composed of three prisms. A blue reflecting dichroic mirror and a red reflecting dichroic mirror are formed on proximity surfaces of the prisms, respectively.

The three reflection-type light valves 96a, 96b, and 96c are used for red, green, and blue light, respectively. The light from the total reflection prism 94 is first incident on the blue reflecting dichroic mirror so that only blue light is reflected thereby, and the thus obtained blue light is incident on the reflection-type light valve 96c for blue light. Then, the light transmitted through the blue reflecting dichroic mirror is incident on the red reflecting dichroic mirror so that only red light is reflected thereby, and the thus obtained red light is incident on the reflection-type light valve 96a for red light. Then, green light transmitted through both the blue reflecting dichroic mirror and the red reflecting dichroic mirror is incident on the reflection-type light valve 96b for green light.

The light beams of three colors are reflected by the respective corresponding reflection-type light valves 96a, 96b, and 96c, and then are synthesized into one beam again by the blue reflecting dichroic mirror and the red reflecting dichroic mirror to be incident on the total reflection prism 94.

Among the illumination light incident on the reflection-type light valves 96a, 96b, and 96c, light corresponding to a white image passes through the total reflection prism 94 and the projection lens 97 to be magnified and projected onto a screen (not shown). On the other hand, light corresponding to a black image travels outside of an effective diameter of the projection lens 97, and does not reach the screen.

In the present embodiment, the optical axes 80a, 80b, 80c, and 80d of the light sources 81a, 81b, 81c, and 81d, respectively, are arranged so as to be parallel to one another as described above and to be vertical to an optical axis 98 of the projection lens 97.

An arc lamp such as an extra-high pressure mercury lamp used as the light sources 81a, 81b, 81c, and 81d can ensure sufficient reliability and life when in use in a direction of rotation with respect to the optical axes 80a, 80b, 80c, and 80d. However, when the lamp is used in a state of being tilted in directions other than the above, a significant decrease in reliability and life is expected in many cases. In general, a projection display device often is placed so as to project an image in a direction of rotation with respect to a horizontal axis of the set. According to the arrangement of the present embodiment, reliability and life can be ensured in any posture as long as the image is projected in a direction of rotation with respect to a horizontal axis of the set.

Embodiment 4

Figure 10A:
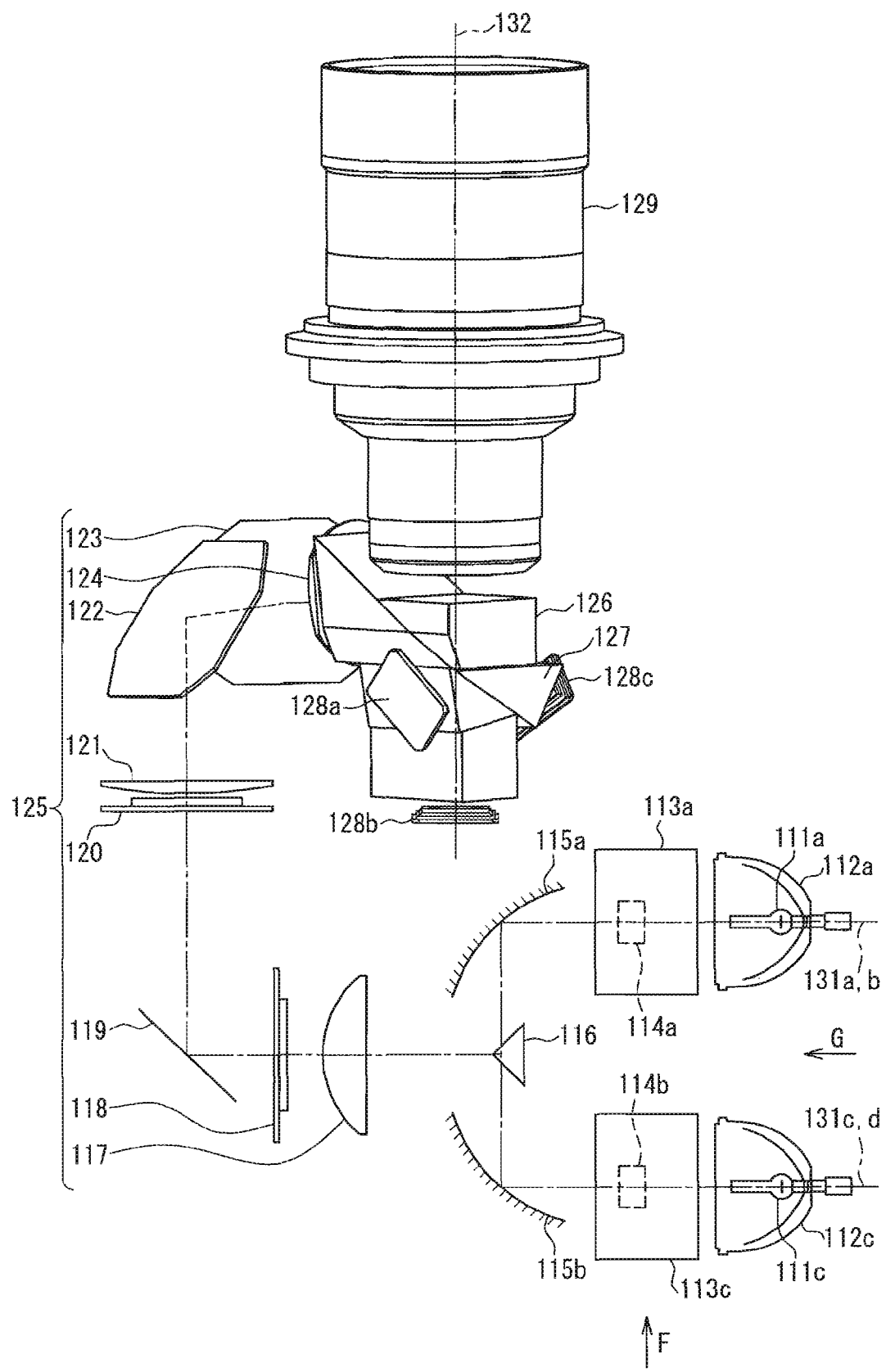
FIG. 10A is a front view showing an overall configuration of a projection display device according to Embodiment 4 of the present invention.
Figure 10B:
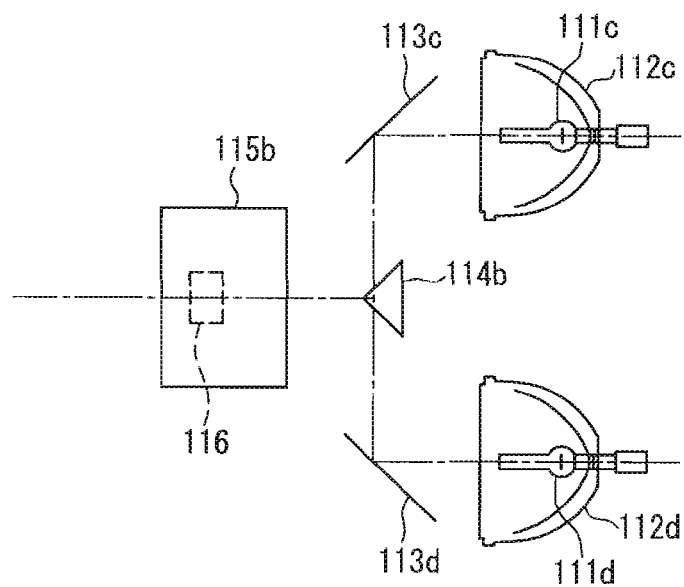
FIG. 10B is a bottom view showing an arrangement of light sources in FIG. 10A seen in a direction of an arrow F.
Figure 10C:
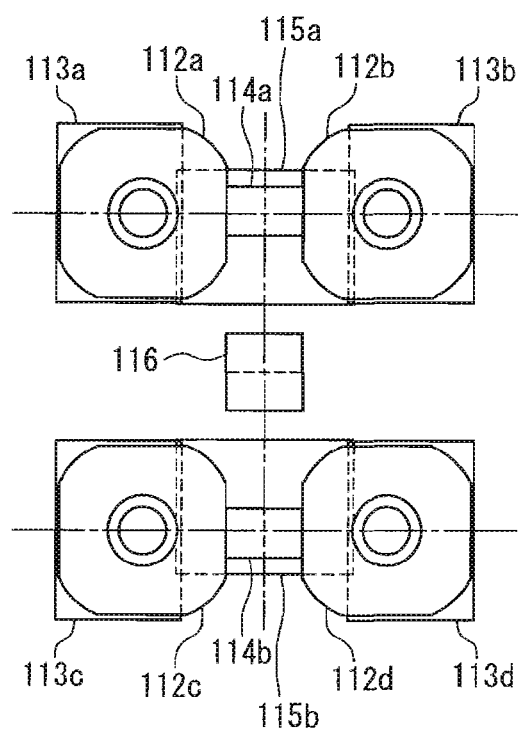
FIG. 10C is a side view showing the arrangement of the light sources in FIG. 10A seen in a direction of an arrow G.
Figure 11:
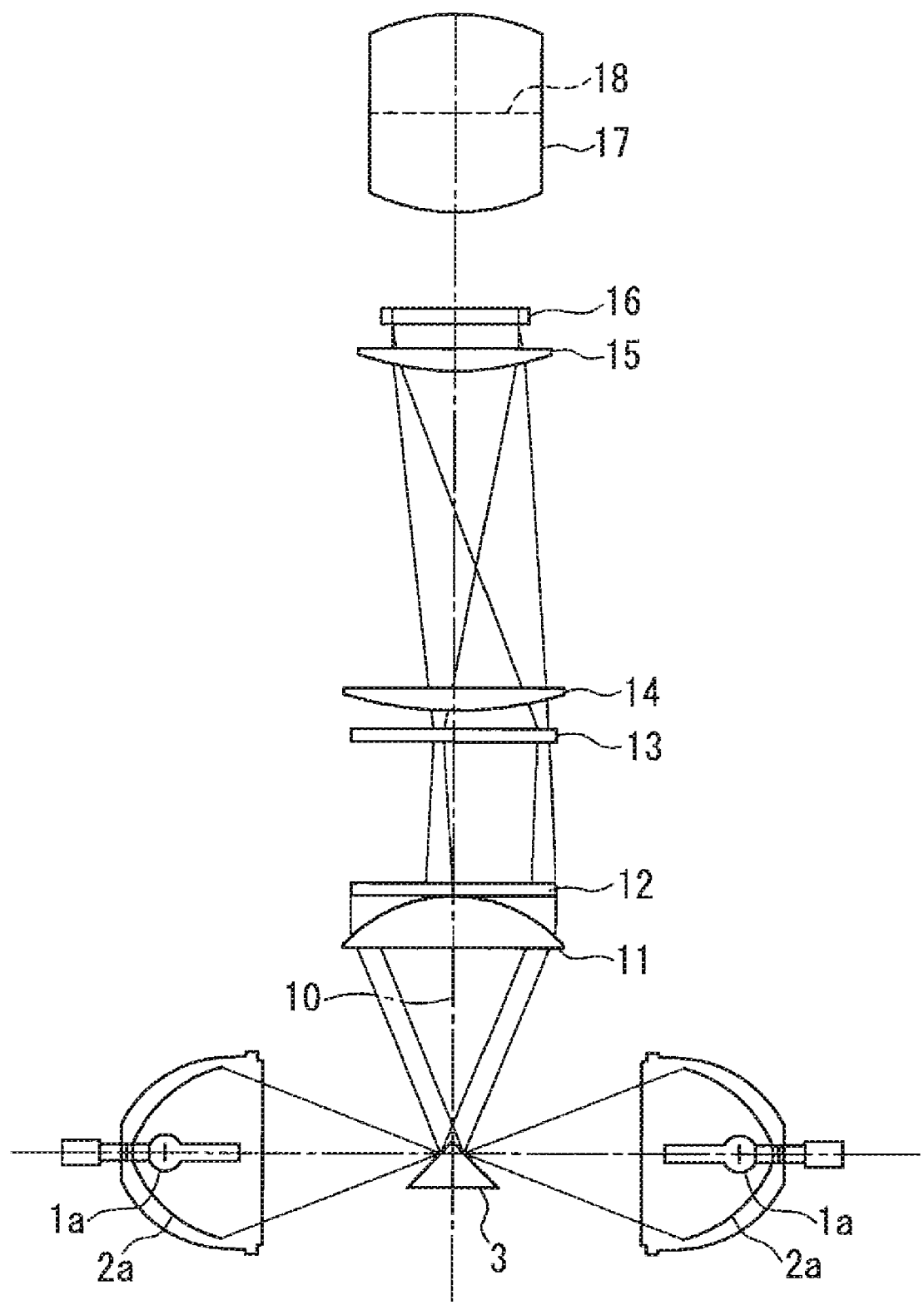
FIG. 11 is a front view showing an overall configuration of a projection display device according to a conventional example.

FIG. 10A is a front view showing an overall configuration of a projection display device according to Embodiment 4 of the present invention. FIG. 10B is a bottom view showing an arrangement of light sources seen in a direction of an arrow F. FIG. 10C is a side view showing the arrangement of the light sources seen in a direction of an arrow G.

Reflection-type light valves 128a, 128b, and 128c are used as spatial light modulators. Each of the reflection-type light valves has mirror elements arranged in a matrix on a pixel basis, and modulates a traveling direction of light depending on a video signal so as to form an optical image as a change in the reflection angle. An extra-high pressure mercury lamp is used as each of four light sources 111a, 111b, 111c, and 111d.

Ellipsoidal mirrors 112a, 112b, 112c, and 112d function as a first collective optical system. First light combiner prisms 114a and 114b function as a first light combiner optical system. Concave mirrors 115a and 115b function as a second collective optical system. A second light combiner prism 116 functions as a second light combiner optical system. Lenses 117, 121, 124, a first lens array 118, a second lens array 120, and total reflection mirrors 122 and 123 function as a third collective optical system 125.

Light beams output from the light sources 111a, 111b, 111c, and hid are focused by the ellipsoidal mirrors 112a, 112b, 112c, and 112d, respectively, each having an ellipsoidal shape in cross section, via corresponding cold mirrors 113a, 113b, 113c, and 113d. Each of the cold mirrors 113a, 113b, 113c, and 113d has a structure in which a dielectric multilayer film that reflects visible light and allows ultraviolet light and infrared light to pass therethrough is formed on a surface of a transparent glass plate. According to the above-described arrangement, it is required to consider light resistance and cooling only for the surroundings of the cold mirrors 113a, 113b, 113c, and 113d, and it is less required to consider light resistance and heat resistance concerning ultraviolet light and infrared light since only visible light reaches the downstream optical components.

Images of the light sources 111a, 111b, 111c, and hid focused by the ellipsoidal mirrors 112a, 112b, 112c, and 112d, respectively, are formed on mirror formation surfaces of the respective corresponding first light combiner prisms 114a and 114b via the cold mirrors 113a, 113b, 113c, and 113d to be reflected toward sides of the concave mirrors 115a and 115b, respectively. Each of the first light combiner prisms 114a and 114b has an isosceles triangular prism shape in cross section, and has on its light incident surface a dielectric multilayer mirror formed by laminating a low refractive index material and a high refractive index material alternately.

The exiting light beams from the light combiner prisms 114a and 114b travel as divergent light in a state where optical axes 71a and 71b of the collection light beams from the ellipsoidal mirrors 112a and 112b, respectively, and optical axes 71c and 71d of the focused light beams from the ellipsoidal mirrors 112c and 112d, respectively, are dose to each other, and then are converted into collection light beams again by the respective corresponding concave mirrors 115a and 115b.

The light beams focused by the concave mirrors 115a and 115b are reflected by a mirror formation surface of the second light combiner prism 116 toward a side of the third collective optical system 125 as divergent light again. The prism 116 also has an isosceles triangular prism shape in cross section, and has on its light incident surface a dielectric multilayer mirror formed by laminating a low refractive index material and a high refractive index material alternately.

The third collective optical system 125 includes the lens 117 with a positive power, the first lens array 118, a total reflection mirror 119, the second lens array 120, the lens 121 with a positive power, the total reflection mirrors 122 and 123, and the lens 124 with a positive power, which are arranged in this order. The exiting divergent light from the light combiner prism 116 is converted into substantially parallel light by the lens 117 to be incident on the first lens array 118. The first lens array 118 segments the images of the light sources so as to achieve illumination with high efficiency and high uniformity. The exiting light from the first lens array 118 passes through the second lens array 120 via the total reflection mirror 119 and through the positive lens 121, and then is reflected by the total reflection mirrors 122 and 123 to be incident on the lens 124.

Exiting light from the lens 124 passes through a total reflection prism 126 to be incident on a color separating and combiner prism 127. The color separating and combiner prism 127 separates the white light into light beams of three primary colors of red, blue, and green, and the thus obtained illumination light beams are incident on the corresponding three light valves 128a, 128b, and 128c.

The three light valves 128a, 128b, and 128c modulate a traveling direction of the light depending on respective video signals so as to form an optical image. Reflected light beams from the light valves 128a, 128b, and 128c are synthesized into one beam again by the color separating and combiner prism 67, and the thus obtained light passes through the total reflection prism 126 to be magnified and projected by a projection lens 129.

Hereinafter, each of the above-described components of the projection display device of the present embodiment will be described in more detail.

It is desirable that the ellipsoidal shape of each of the ellipsoidal mirrors 112a, 112b, 112c, and 112d satisfies the condition expressed by the Formula (1) as in Embodiment 1.

Also in the present embodiment, when the value of $f_{E2}/f_{E1}$ in the Formula (1) is smaller than 8, the image of an illuminant of the light source is formed in the second focal length $f_{E2}$ at a higher magnification, resulting in a decrease in condensing efficiency. Thus, in order to compensate for the decrease in light condensing efficiency, it is required to increase an effective area of all the downstream optical components. This makes the entire set larger, and thus it becomes difficult to configure the set with a compact size.

On the other hand, when the above numerical value is larger than 11, a collection angle at which the light is focused in the second focal length $f_{E2}$ becomes larger. Consequently, it is required to increase an effective diameter of the downstream lens systems, and also in this case, it becomes difficult to configure the set with a compact size.

Meanwhile, when the second focal length $f_{E2}$ is longer, an optical path length becomes longer. This similarly makes it impossible to achieve a compact configuration on the periphery of the ellipsoidal mirrors 112a, 112b, 112c, and 112d.

When the first focal length $f_{E1}$ is shorter, the light sources 111a, 111b, 111c, and 111d are close to the ellipsoidal mirrors 112a, 112b, 112c, and 112d, respectively. This makes it difficult for both the light sources 111a, 111b, 111c, and 111d and the ellipsoidal mirrors 112a, 112b, 112c, and 112d to satisfy a favorable cooling condition for ensuring reliability.

When the second focal length $f_{E2}$ is shorter, the ellipsoidal mirrors 112a, 112b, 112c, and 112d are dose to the downstream optical systems, which makes it difficult to configure a holding structure and a cooling structure.

As in Embodiment 3, each of the concave mirrors 84a and 84b has an anamorphic aspherical shape in which a light incident surface is not rotationally symmetric with respect to an optical axis. A mirror formation surface has a focal length that is changed continuously depending on an incident angle of each of the divergent light beams, so that the exiting divergent light beams from an exiting point of the light combiner prisms 114a and 114b are focused on an incident point on the light combiner prism 116 as converged light again.

In the above-described configuration, the optical axes 131a, 131b, 131c, and 131c of the light sources 111a, 111b, 111c, and 111d, respectively, are arranged so as to be parallel to one another.

Further, the light sources 111a and 111b, the ellipsoidal mirrors 112a and 112b, as well as the cold mirrors 113a and 113b are arranged axisymmetrically with respect to a vertical line from an apex to a base of the isosceles triangle of the cross-sectional shape of the corresponding light combiner prism 114a. Similarly, the light sources 111c and 111d, the ellipsoidal mirrors 112c and 112d, as well as the cold mirrors 113c and 113d are arranged axisymmetrically with respect to a vertical line from an apex to a base of the isosceles triangle of the cross-sectional shape of the corresponding light combiner prism 114b.

In the present embodiment, with the configuration using the cold mirrors 113a, 113b, 113c, and 113d, the light sources 111a, 111b, 111c, and 111d are all arranged in the same direction in parallel with and in close proximity to one another. This has the advantage that the light sources 111a, 111b, 111c, and 111d can be arranged in a posture under the same condition at all times and a cooling structure can be configured with a compact size.

Further, a system composed of the light sources 111a and 111b, the ellipsoidal mirrors 112a and 112b, the cold mirrors 113a and 113b, the light combiner prism 114a, and the concave mirror 115a and a system composed of the light sources 111c and 111d, the ellipsoidal mirrors 112c and 112d, the cold mirrors 113c and 113d, the light combiner prism 114b, and the concave mirror 115b are arranged axisymmetrically with respect to a vertical line from an apex to a base of the isosceles triangle of the cross-sectional shape of the light combiner prism 116.

Further, the four optical axes formed in the optical systems after the four light sources 111a, 111b, 111c, and 111d are designed so as to be located at respective four corners of a substantially square shape in cross section when the light beams exit from the light combiner prism 116. In other words, the adjacent optical axes of the four optical axes are arranged so that the light beams are incident on the third collective optical system 125 at equal intervals to one another.

According to the above-described arrangement, even in the case of the optical system using the plurality of light sources, brightness non-uniformity is less likely to occur due to the symmetric illumination light beams. Further, the entire optical system can be configured with a compact size with no wasted space, and by arranging the same optical components symmetrically, a holding structure and a cooling structure also can be configured by using the common components.

The first lens array 118 is configured such that an aperture shape of each segmented lens is taken as a secondary surface light source. Each of the lenses of the first lens array 118 has an outer shape having the same aspect ratio as that of an effective display surface of each of the reflection-type light valves 128a, 128b, and 128c, and allows images of the light sources to be formed on a corresponding lens of the second lens array 120 so that the images are segmented into as many pieces as the number of the lens arrays. Consequently, the images of the illuminants of the four light sources 111a, 111b, 111c, and hid are formed on each of the lenses of the second lens array 120.

In order to allow the images of the four illuminants to be arranged in an effective region of the second lens array 120 in a closely packed manner, an aperture shape of each of the lenses of the second lens array 120 is optimized in accordance with the position where the image of the illuminant is formed. This makes it possible to achieve favorable condensing efficiency without increasing an effective diameter of the second lens array 120.

The light output from the second lens array 120 illuminates each of the reflection-type light valves 128a, 128b, and 128 in a state where the images in shapes of the respective lenses of the first lens array 118 overlap each other by the second lens array 120 and the lenses 121 and 124 via the total reflection mirrors 122 and 123 along the path. With this configuration as in Embodiment 1, it is possible to achieve uniform illumination with high condensing efficiency corresponding to the aspect ratio of each of the reflection-type light valves 128a, 128b, and 128c.

The total reflection prism 126 is composed of two prisms, and a very thin air layer is formed between proximity surfaces of the prisms. The angle of the air layer is set so that the illumination light is incident on the air layer at an angle equal to or larger than a critical angle, and is totally reflected therefrom to travel toward a side of the reflection-type light valves 128a, 128b, 128c in an oblique direction, and the light reflected from the reflection-type light valves 128a, 128b, and 128c as a projected image is incident on and transmitted through the air layer at an angle equal to or smaller than a critical angle to be incident on the projection lens 129. Thus, by providing the total reflection prism 126, the entire projection optical system can be configured with a compact size.

The color separating and combiner prism 127 arranged between the total reflection prism 126 and the reflection-type light valves 128a, 128b, and 128c is composed of three prisms. A blue reflecting dichroic mirror and a red reflecting dichroic mirror are formed on proximity surfaces of the prisms, respectively.

The three reflection-type light valves 128a, 128b, and 128c are used for red, green, and blue light, respectively. The light from the total reflection prism 126 is first incident on the blue reflecting dichroic mirror so that only blue light is reflected thereby, and the thus obtained blue light is incident on the reflection-type light valve 128c for blue light. Then, the light transmitted through the blue reflecting dichroic mirror is incident on the red reflecting dichroic mirror so that only red light is reflected thereby, and the thus obtained red light is incident on the reflection-type light valve 128a for red light. Then, green light transmitted through both the blue reflecting dichroic mirror and the red reflecting dichroic mirror is incident on the reflection-type light valve 128b for green light. The light beams of three colors are reflected by the respective corresponding reflection-type light valves 128a, 128b, and 128c, and then are synthesized into one beam again by the blue reflecting dichroic mirror and the red reflecting dichroic mirror to be incident on the total reflection prism 126.

Among the illumination light incident on the reflection-type light valves 128a, 128b, and 128c, light corresponding to a white image passes through the total reflection prism 126 and the projection lens 129 to be magnified and projected onto a screen (not shown). On the other hand, light corresponding to a black image travels outside of an effective diameter of the projection lens 129, and does not reach the screen.

In this case, the optical axes 131a, 131b, 131c, and 131d of the light sources 111a, 111b, 111c, and 111d, respectively, are arranged so as to be parallel to one another as described above and to be vertical to an optical axis 132 of the projection lens 129.

In the present embodiments, a reflection-type light valve that modulates a traveling direction of light is used as the light valve. However, if a configuration is such that a part of unnecessary light illuminates outside of an effective display region, a light valve that modulates a polarization direction or a scattering state of light or a transmission-type light valve also may be used to achieve the same effects.

Further, the four light sources are used in the present embodiment. However, it is also possible to use four or more light sources on the basis of the same concept as long as the configuration using the focusing lens systems of Embodiment 1 or 2 or the configuration using the concave mirrors of Embodiment 3 or 4 is employed.

INDUSTRIAL APPLICABILITY

The present invention is useful for a projection display device such as a projector that, in the case of using a plurality of light sources, ensures reliability by suppressing power consumption of a single light source, and can achieve illumination with high efficiency with a compact size projecting an image with extra-high brightness.

The invention claimed is:
1. An illumination optical device comprising:
2n (n is 2 or more) light sources;
2n first collective optical systems composed of ellipsoidal mirrors that are arranged so as to focus light beams emitted from the respective light sources;
n first light combiner optical systems that are composed of prisms, each having an isosceles triangular prism shape in cross section, and are arranged so as to synthesize exiting light beams from respective corresponding two of the first collective optical systems;
second collective optical systems arranged so as to focus exiting light beams from the respective first light combiner optical systems;
a n/2 second light combiner optical system composed of a prism having an isosceles triangular prism shape in cross section and arranged so as to synthesize exiting light beams from respective corresponding two of the second collective optical systems; and
a third collective optical system composed of a plurality of lenses and a plurality of lens arrays and arranged so as to allow exiting light beam from the second light combiner optical system to be incident thereon,
wherein the 2n first collective optical systems each have an optical axis substantially parallel to one another.

2. The illumination optical device according to claim 1, wherein each of the second collective optical systems is composed of at least one lens.

3. The illumination optical device according to claim 1, wherein a first focal length $f_{E1}$ and a second focal length $f_{E2}$ of an ellipsoid of each of the first collective optical systems satisfy a relationship expressed by the following Formula (1)

$$8 \leq f_{E2}/f_{E1} \leq 11 \qquad (1).$$

4. The illumination optical device according to claim 2, wherein the lens as each of the second collective optical systems is composed of two lenses, i.e., an entrance-side lens on which the light beam from each of the first light combiner optical systems is incident and an exit-side lens from which the light beam exits, each being a positive lens and having an effective aperture and a focal length substantially equal to each other.

5. The illumination optical device according to claim 4, wherein the two lenses are of substantially equal shape to each other.

6. The illumination optical device according to claim 4, wherein the two lenses are aspherical lenses for amending a spherical aberration.

7. The illumination optical device according to claim 6, wherein an aspherical shape of each of the two lenses is ellipsoidal.

8. The illumination optical device according to claim 1,
wherein an optical axis of each of the 2n first collective optical systems that exits from each of the second collective optical systems is substantially parallel to an optical axis of each of the second collective optical systems,
the optical axis of each of the first collective optical systems that is reflected by each of the first light combiner optical systems intersects the optical axis of each of the second collective optical systems in a plane including a normal line to a reflecting surface of each of the first light combiner optical systems and the optical axis of each of the first collective optical systems, and
L1 and L2 satisfy a relationship expressed by the following Formula (2), where L1 is a distance from a point of intersection of the optical axis of each of the first collective optical systems and the optical axis of each of the second collective optical systems to a midpoint between a light incident surface and a light exiting surface of each of the second collective optical systems, and L2 is a distance from the point of intersection of the optical axis of each of the first collective optical systems and the optical axis of each of the second collective optical systems to a position where the optical axis of each of the first collective optical systems that is reflected by each of the first light combiner optical systems intersects the optical axis of each of the second collective optical systems $$L1/3 \leq L2 \leq L1 \quad (2).$$

9. The illumination optical device according to claim 8, wherein L2 and L3 satisfy relationships expressed by the following Formulas (3), where L3 is a distance between a position where the optical axis of each of the first collective optical systems is reflected by each of the first light combiner optical systems and the optical axis of each of the second collective optical systems $$L3/L2 = \tan \theta$$

$$5° \leq \theta \leq 20° \quad (3).$$

10. The illumination optical device according to claim 9, wherein the distance L3 satisfies the following Formula (4)

$$1.2 \text{ mm} \leq L3 \leq 5 \text{ mm} \quad (4).$$

11. The illumination optical device according to claim 1, wherein the third collective optical system is composed of a first positive lens, a first lens array, a second lens array, a second positive lens, and a third positive lens that are arranged in this order from a light incident side.

12. The illumination optical device according to claim 11, wherein the second lens array is composed of microlenses, each having a different aperture shape so as to allow images of all the plurality of light sources to be formed efficiently in accordance with a size of the image of each of the light sources at each position.

13. The illumination optical device according to claim 1, wherein
  each of the prisms as the first light combiner optical systems and the second light combiner optical system has a dielectric multilayer mirror on a light incident surface, and
  the dielectric multilayer mirror is formed of a multilayer film in which a $SiO_2$ layer as a low refractive index layer and a $Ta_2O_5$ layer or a layer of a mixture of $Ta_2O_5$ and $TiO_2$ as a high refractive index layer are laminated alternately.

14. The illumination optical device according to claim 1, wherein each of the first collective optical systems, each of the second collective optical systems, and the third collective optical system satisfy a relationship expressed by the following Formula (5)

$$(D_1/f_1) = (D_2/f_2) = (D_3/f_3) \quad (5)$$

where $D_1$ denotes an effective diameter of an aperture of each of the ellipsoidal mirrors as the first collective optical systems on a light exiting side,
$f_1$ denotes a distance from an aperture surface of each of the ellipsoidal mirrors on the light exiting side to a surface on which the light beam emitted from each of the light sources is focused in the smallest size,
$D_2$ denotes an effective aperture of each of the entrance-side lens and the exit-side lens composing each of the second collective optical systems,
$f_2$ denotes a focal length of each of the entrance-side lens and the exit-side lens,
$D_3$ denotes an effective aperture of the first positive lens composing the third collective optical system, and
$f_3$ denotes a focal length of the first positive lens.

15. The illumination optical device according to claim 1, wherein the plurality of light sources as well as the plurality of first collective optical systems are arranged axisymmetrically with respect to a vertical line from an apex to a base of the isosceles triangle of the cross-sectional shape of the respective corresponding prisms as the first light combiner optical systems.

16. The illumination optical device according to claim 1, wherein the plurality of light sources, the plurality of first collective optical systems, the plurality of first light combiner optical systems, as well as the plurality of second collective optical systems are arranged axisymmetrically with respect to a vertical line from an apex to a base of the isosceles triangle of the cross-sectional shape of the corresponding prism as the second light combiner optical system.

17. The illumination optical device according to claim 1, comprising:
  the four light sources and the four first collective optical systems; and
  the two first light combiner optical systems and the two second collective optical systems,
  wherein each of the two first light combiner optical systems synthesizes the exiting light beams from corresponding two of the light sources and the first collective optical systems,
  the second light combiner optical system synthesizes the exiting light beams from the two first light combiner optical systems and the two second collective optical systems, and
  optical axes corresponding to the four light sources that exit from the second light combiner optical system are located at respective four corners of a substantially square shape in cross section.

18. The illumination optical device according to claim 1, wherein each of the second collective optical systems is composed of a concave mirror whose reflecting surface has an anamorphic aspherical shape.

19. The illumination optical device according to claim 18, wherein a first focal length $f_{E1}$ and a second focal length $f_{E2}$ of an ellipsoid of each of the first collective optical systems satisfy a relationship expressed by the following Formula (1)

$$8 \leq f_{E2}/f_{E1} \leq 11 \quad (1).$$

20. The illumination optical device according to claim 18, wherein the concave mirror as each of the second collective optical systems has a focal length that is changed continuously in each of a first cross-sectional shape on a plane including an optical axis of the incident light beam exiting from each of the first light combiner optical systems and an optical axis of the exiting light beam reflected by the concave mirror, and a second cross-sectional shape in a direction vertical to the first cross-sectional shape,
  the first cross-sectional shape and the second cross-sectional shape are anamorphic aspherical shapes that are different from each other, and
  the exiting light beam from each of the first light combiner optical systems is focused at a substantially one point by each of the second collective optical systems.

21. The illumination optical device according to claim 20, wherein the first cross-sectional shape of the concave mirror as each of the second collective optical systems satisfies the following Formula (6)

$$f_n = L_n(L_0 - L_n)/L_0 \quad (6)$$

where $f_n$ denotes a focal length at an arbitrary light incident point, $L_n$ denotes a distance for which an arbitrary light beam travels from a light exiting point of each of the first light combiner optical systems on an optical axis thereof to a light incident point on each of the second collective optical systems where the light beam is incident, the distance being in a direction parallel to the optical axis, and $L_0$ denotes a total sum of the distance from the light exiting point of each of the first light combiner optical systems on the optical axis to the incident point on each of the second collective optical systems and a distance from an exiting point of each of the second collective optical systems to an incident point on the second light combiner optical system.

22. The illumination optical device according to claim 18, wherein the concave mirror has on its mirror surface a dielectric multilayer film formed of an alternating periodic layer of a low refractive index layer and a high refractive index layer, which has a property of allowing ultraviolet light and infrared light to pass therethrough and reflecting visible light.

23. The illumination optical device according to claim 22, wherein the low refractive index layer is a $SiO_2$ layer, and the high refractive index layer is a layer made of any one of $TiO_2$, $Ta_2O_5$, and $Nb_2O_5$ or a layer made of a mixture thereof.

24. The illumination optical device according to claim 20, wherein the concave mirror has a mirror substrate that is made of a glass material and is molded integrally with a holding structure.

25. The illumination optical device according to claim 18, wherein the third collective optical system is composed of a first positive lens, a first lens array, a second lens array, a second positive lens, and a third positive lens that are arranged in this order from a light incident side.

26. The illumination optical device according to claim 25, wherein the second lens array is composed of microlenses, each having a different aperture shape so as to allow images of all the plurality of light sources to be formed efficiently in accordance with a size of the image of each of the light sources at each position.

27. The illumination optical device according to claim 18, wherein each of the prisms as the first light combiner optical systems and the second light combiner optical system has a dielectric multilayer mirror on a light incident surface, and the dielectric multilayer mirror is formed of a multilayer film in which a $SiO_2$ layer as a low refractive index layer and a $Ta_2O_5$ layer or a layer of a mixture of $Ta_2O_5$ and $TiO_2$ as a high refractive index layer are laminated alternately.

28. The illumination optical device according to claim 18, wherein the plurality of light sources as well as the plurality of first collective optical systems are arranged axisymmetrically with respect to a vertical line from an apex to a base of the isosceles triangle of the cross-sectional shape of the respective corresponding prisms as the first light combiner optical systems.

29. The illumination optical device according to claim 18, wherein the plurality of light sources, the plurality of first collective optical systems, the plurality of first light combiner optical systems, as well as the plurality of second collective optical systems are arranged axisymmetrically with respect to a vertical line from an apex to a base of the isosceles triangle of the cross-sectional shape of the corresponding prism as the second light combiner optical system.

30. The illumination optical device according to claim 18, comprising:

the four light sources and the four first collective optical systems; and the two first light combiner optical systems and the two second collective optical systems, wherein each of the two first light combiner optical systems synthesizes the exiting light beams from corresponding two of the light sources and the first collective optical systems, the second light combiner optical system synthesizes the exiting light beams from the two first light combiner optical systems and the two second collective optical systems, and optical axes corresponding to the four light sources that exit from the second light combiner optical system are located at respective four corners of a substantially square shape in cross section.

31. A projection display device comprising:

an image forming device that modifies incident light to form an image;

an illumination optical device that illuminates the image forming device with light from light sources; and a projection device that magnifies and projects an optical image formed on the image forming device, wherein the illumination optical device according to any one of claims 1 to 30 is used as the illumination optical device.

32. The projection display device according to claim 31, wherein an optical axis of the light emitted from the plurality of light sources is orthogonal to an optical axis of the projection device.

* * * * *